United States Patent
Baindur et al.

[11] Patent Number: 6,073,176
[45] Date of Patent: Jun. 6, 2000

[54] DYNAMIC BIDDING PROTOCOL FOR CONDUCTING MULTILINK SESSIONS THROUGH DIFFERENT PHYSICAL TERMINATION POINTS

[75] Inventors: Ashwin Baindur, San Jose; Andrew G. Harvey, Pleasanton; Pokman Perry Leung, Fremont; Andrew J. Valencia, San Mateo; Shoou Jiah Yiu, Los Altos, all of Calif.

[73] Assignee: Cisco Technology, Inc., San Jose, Calif.

[21] Appl. No.: 08/846,788

[22] Filed: Apr. 30, 1997

Related U.S. Application Data

[63] Continuation-in-part of application No. 08/687,973, Jul. 29, 1996
[60] Provisional application No. 60/034,508, Dec. 27, 1996.

[51] Int. Cl.[7] .................................................. G06F 15/16
[52] U.S. Cl. .................. 709/227; 709/218; 709/226; 709/225; 709/235; 709/249
[58] Field of Search .................................. 709/218, 227, 709/226, 225, 235, 249

[56] References Cited

U.S. PATENT DOCUMENTS

| | | |
|---|---|---|
| 4,644,532 | 2/1987 | George et al. . |
| 4,669,113 | 5/1987 | Ash et al. ................................. 379/221 |
| 5,014,265 | 5/1991 | Hahne et al. . |
| 5,159,592 | 10/1992 | Perkins . |
| 5,265,245 | 11/1993 | Nordstrom et al. ..................... 395/600 |
| 5,274,634 | 12/1993 | Babiarz ...................................... 370/60 |
| 5,347,511 | 9/1994 | Gun ........................................... 370/54 |
| 5,371,852 | 12/1994 | Attanasio et al. . |
| 5,416,842 | 5/1995 | Aziz . |
| 5,602,918 | 2/1997 | Chen et al. . |
| 5,604,803 | 2/1997 | Aziz . |
| 5,623,605 | 4/1997 | Keshav et al. . |
| 5,631,897 | 5/1997 | Pacheco et al. .......................... 370/237 |
| 5,642,515 | 6/1997 | Jones et al. . |
| 5,689,566 | 11/1997 | Nguyen . |
| 5,715,399 | 2/1998 | Bezos . |
| 5,717,690 | 2/1998 | Peirce, Jr. et al. ....................... 370/389 |
| 5,740,371 | 4/1998 | Wallis .................................. 395/200.59 |
| 5,745,708 | 4/1998 | Weppler et al. ......................... 395/299 |

OTHER PUBLICATIONS

Article authored by Kevin Fogarty and Tim Greene entitled "Microsoft tunnels through the 'Net with new protocol."
D. Mathieson, C. Kalbfleisch, S. Hunt, and K. Low, "High Speed Serial Communications for Control Systems," IEEE, pp. 1826–1828.

*Primary Examiner*—Frank J. Asta
*Assistant Examiner*—Stephan Willett
*Attorney, Agent, or Firm*—Marger Johnson et al.

[57] ABSTRACT

A stack group bidding protocol (SGBP) establishes systems as members of a stack group connected together through one or more networks. When an event, such as establishment of a point-to-point link, occurs on one of the systems, a bid request is sent to each stack group member. Each stack group member then bids for the event. The bid is based on dynamic bid weighting criteria that varies depending on the computation capacity of the member at the time the bid request is initiated. A multichassis multilink PPP (MLP) protocol utilizes the SGBP to conduct multilink PPP sessions for links that either originate or terminate on different physical systems. A L2F forwarding protocol is used in combination with multichassis MLP to forward the links from one system to another system and offers location transparency.

36 Claims, 15 Drawing Sheets

ESTABLISH STACK GROUP
THROUGH HELLO PROTOCOL

HELLO PROTOCOL FOR
BUILDING SGBP MESH

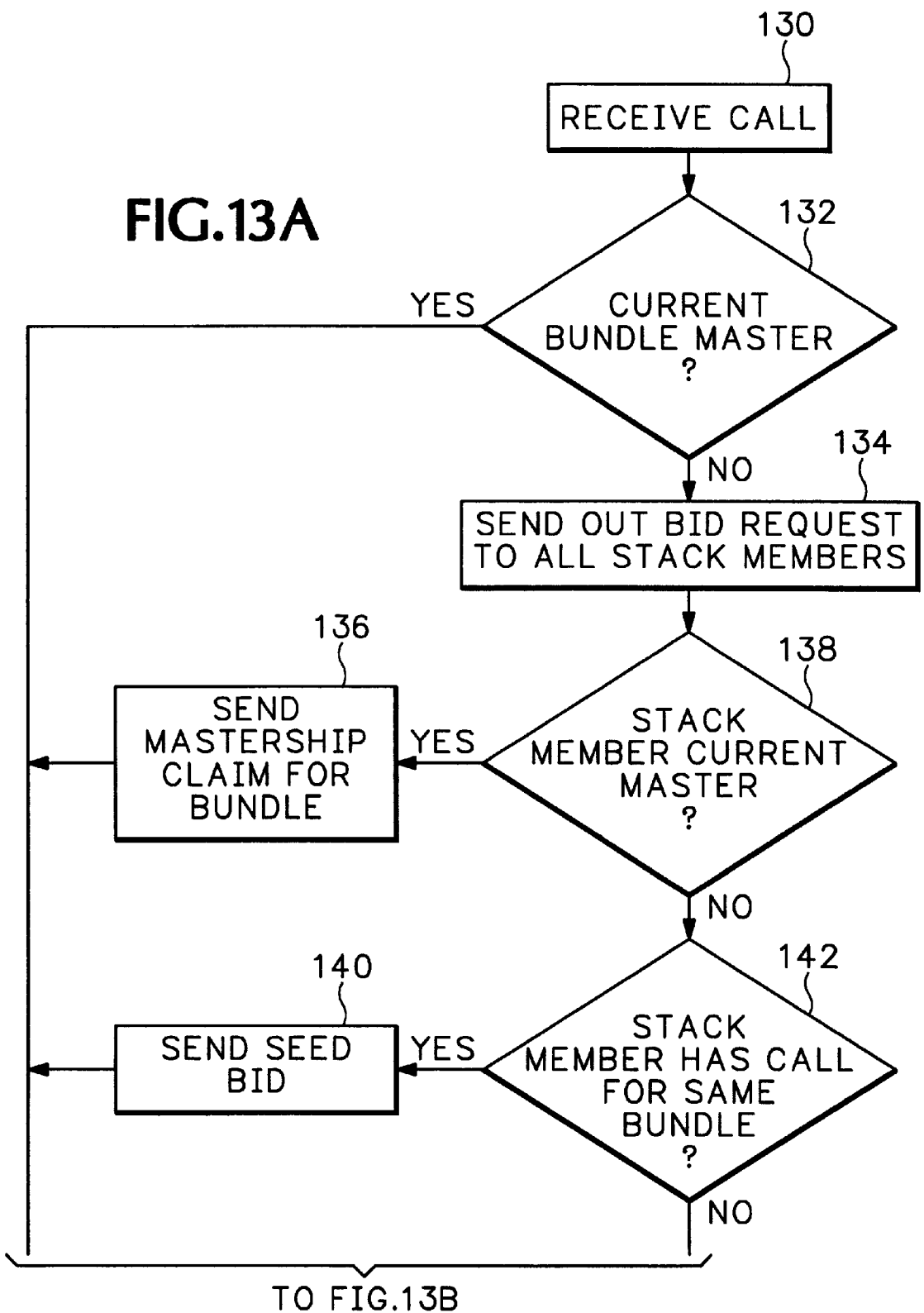

DYNAMIC BIDDING PROTOCOL FOR CONDUCTING MULTILINK SESSIONS THROUGH DIFFERENT PHYSICAL TERMINATION POINTS

This application is a continuation-in-part of pending application Ser. No. 08/687,973 filed on Jul. 29, 1996 and a conversion of U.S. Provisional Application Serial No. 60/034,508 filed Dec. 27, 1996.

BACKGROUND OF THE INVENTION

This invention relates generally to a dynamic group bidding protocol (SGBP) and more particularly to a system for conducting multilink sessions through different physical termination points.

FIG. 1 is a prior art internetwork system 12 which includes multiple dial-up network access servers (NAS) 27 also referred to as points of presence (POP). The NASs 27 can be located at different geographical locations around the world. An internet service provider (ISP) 13 operates multiple NASs 27 through a backbone network 16. The ISP backbone network 16 is connected to an internet infrastructure, referred to generally as internet 18. Different remote clients 26A, 26B and 26C dial into one of the NASs 27 in order to access the internet through the ISP backbone network 16.

Local Area Networks (LANs) 22 are typically operated by private companies and include multiple local servers 23A and 23B and multiple local clients 15. The LAN 22 is connected to internet 18 through a home gateway 20. The home gateway 20 includes a firewall 28 that prevents unauthorized external access into the private network 22 through internet 18. While some access is possible from outside the firewall (e.g., electronic mail), resources such as network databases and application programs are only accessible by clients located behind the firewall 28.

An authorized client may need to access files and other resources on network 22 from remote locations, such as when working at home or while on sales trips. Privately operated NASs 24 provide the remote clients with a direct dial-up capability to network 22. Since the NASs 24 are located behind firewall 28, a remote client can dial into the NAS 24 and gain full access to resources on network 22.

In many instances, it is more cost effective for companies to outsource dial-up service to general internet service providers. However, the firewall 28 in home gateway 20 denies access to remote clients that attempt to access LAN 22 through a general internet service provider.

Different network protocols may be used within the internet infrastructure and within the private network 22. For example, the Internet Protocol (IP) is typically used at the network protocol level to send information through the internet 18. However, private networks 22 may use any one of a variety of network protocols including IP, IPX, Appletalk, etc. When a remote client 26B dials into a NAS 27B, the ISP 13 dynamically assigns an IP address to the remote client 26B. The remote client 26B may be denied access by home gateway 20 because the IP address assigned by the ISP network 16 is not one of the authorized addresses in the LAN 22. ISP 13 may not support the network protocol on local network 22. Hence, remote client 26B may be prevented from accessing resources on LAN 22.

Another problem with networked systems is that tasks are not always processed efficiently by the different network resources. Processing is often performed by the computer system that serves as a termination point for transmitted packets. A computer system serving as a termination point might not have sufficient processing power for quickly processing or routing the network packets. Other resources on the network might have more processing power. However, other resources may be overburdened from time to time while processing packets from other network connections.

A link is a connection point provided by a system. The link may be a dedicated hardware interface (eg., an async interface) or a channel on a multi-channel hardware interface (eg., a PRI or BRI). Conventional multilink point to point protocols, such as MLP or X.25, provide additional bandwidth on demand by splitting and recombining packets across a logical pipe (or bundle) formed by multiple links. The bundle is a combination of point to point links that have been negotiated between two peers to run MLP traffic. The MLP reduces transmission latency across slow WAN links by increasing the number of links in the bundle. MLP is described in detail in the PPP Multilink Protocol request for comments (RFC) 1717. MLP cannot operate if the packets are transferred over links originating or terminating on different physical systems.

Large business systems typically use a dial-in pool that includes multiple dial-in servers. Each dial-in server supports a subset of the total number of WAN links. WAN links connecting to the dial-in pool may, therefore, originate or terminate on different dial-in servers. If two WAN links terminate on different dial-in servers in the system dial-in pool, a MLP session cannot be conducted. Thus, restricting MLP sessions to one physical system is not practical for organizations that support large numbers (e.g. hundreds) of WAN access links.

Accordingly, a need remains for improving resource allocation on networks and conducting multilink PPP sessions from different physical termination points.

SUMMARY OF THE INVENTION

A stack group bidding protocol (SGBP) establishes different systems as members of a stack group. Pipes are established between each stack group member. When a task or event occurs, such as establishment of a communication link, a bidding process is conducted by the stack group members. During the bidding process, each stack group member bids for the event.

The bidding process uses a weighting criteria that varies dynamically depending on the computational status of the resource at the time the bidding is initiated. The value bid by each resource is weighted according to whether the system is already controlling or processing similar events, network locality of the system in relation to the event, CPU capacity of the system, current loading of the system, manual override values and an offload criteria that indicates the system making the bid does not want to process the event. The event is allocated to the system making the highest bid.

A multichassis multilink PPP (MLP) protocol utilizes SGBP to conduct multilink PPP sessions for links either originating or terminating on different physical systems. The SGBP establishes the different systems as stack group members that serve as termination points for an MLP bundle. The SGBP bidding scheme then establishes one of the members as master of the MLP bundle. Upon receiving an incoming call upon which MLP has been negotiated, the stack group member determines if a bundle already exists within the stack group where the link can be added. If a bundle exists under the mastership of another stack group member, the link is forwarded to that master as a "tunnelled" link.

A L2F forwarding protocol is used in combination with multichassis MLP to forward the links from one system to another system and offers location transparency. The L2F forwarding protocol is encapsulated around PPP sessions and then sent over a tunnel to the physical system conducting the multilink session.

The foregoing and other objects, features and advantages of the invention will become more readily apparent from the following detailed description of a preferred embodiment of the invention which proceeds with reference to the accompanying drawings.

DETAILED DESCRIPTION

Figure 2:
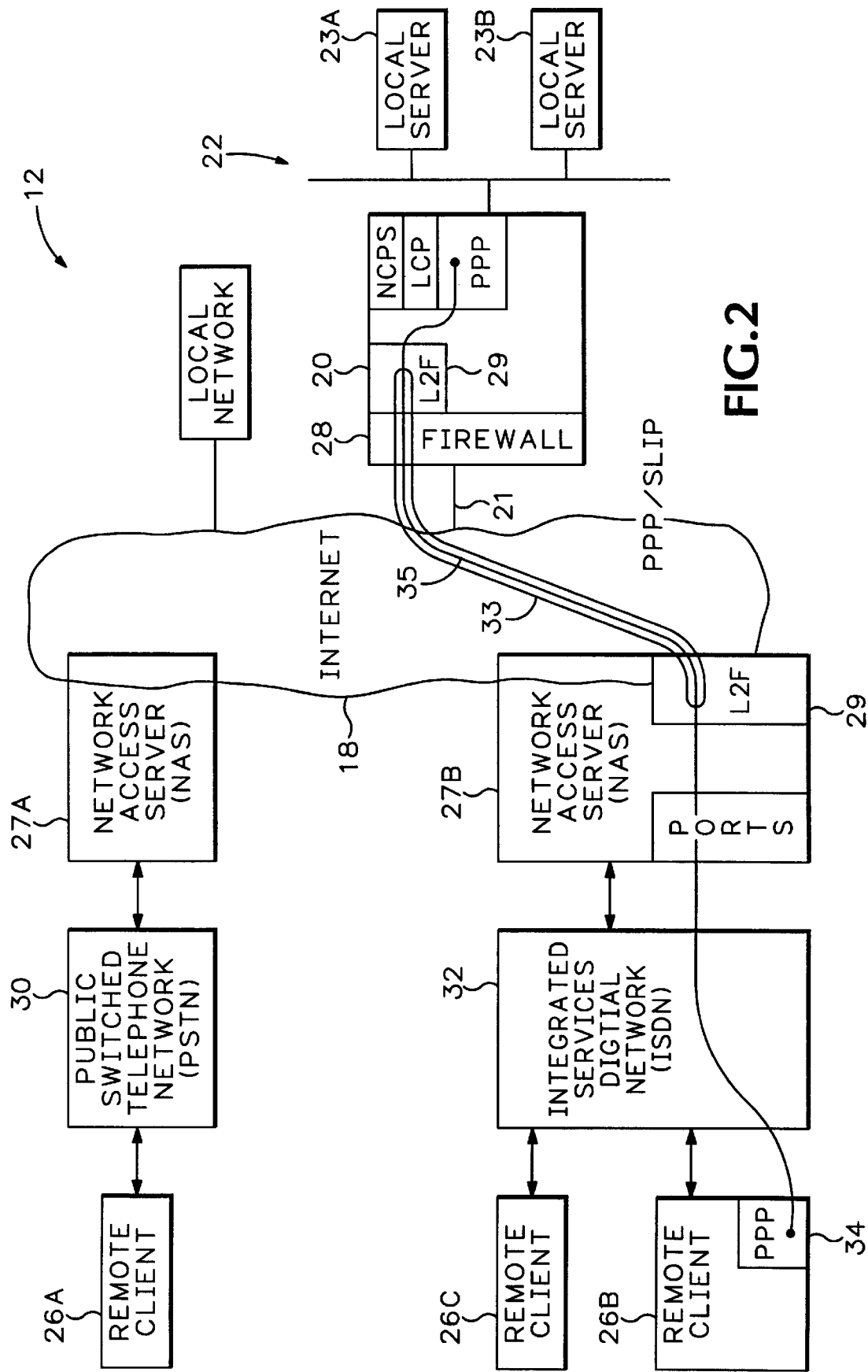
FIG. 2 is a diagram showing a virtual dial-up session according to one embodiment of the invention.

Referring to FIG. 2, a remote client 26A uses the Public Switched Telephone Network (PSTN) 30 (i.e., async PPP via modems) to dial into an Internet Service Provider (ISP) Network Access Server (NAS) 27A that accesses the Internet infrastructure 18. Remote clients 26B and 26C connect to the Integrated Services Digital Network (ISDN) 32 and dial up calls into NAS 27B. A private Local Area Network (LAN) 22 includes local servers 23A and 23B and is connected to internet 18 through a home gateway 20 which includes a firewall 28. The hardware and software required to generally operate NASs 27A, 27B, PSTN 30, ISDN 32, internet infrastructure 18, home gateway 20, firewall 28 and remote clients 26A–26C are all well known to those skilled in the art and are, therefore, not described in detail.

Figure 1:
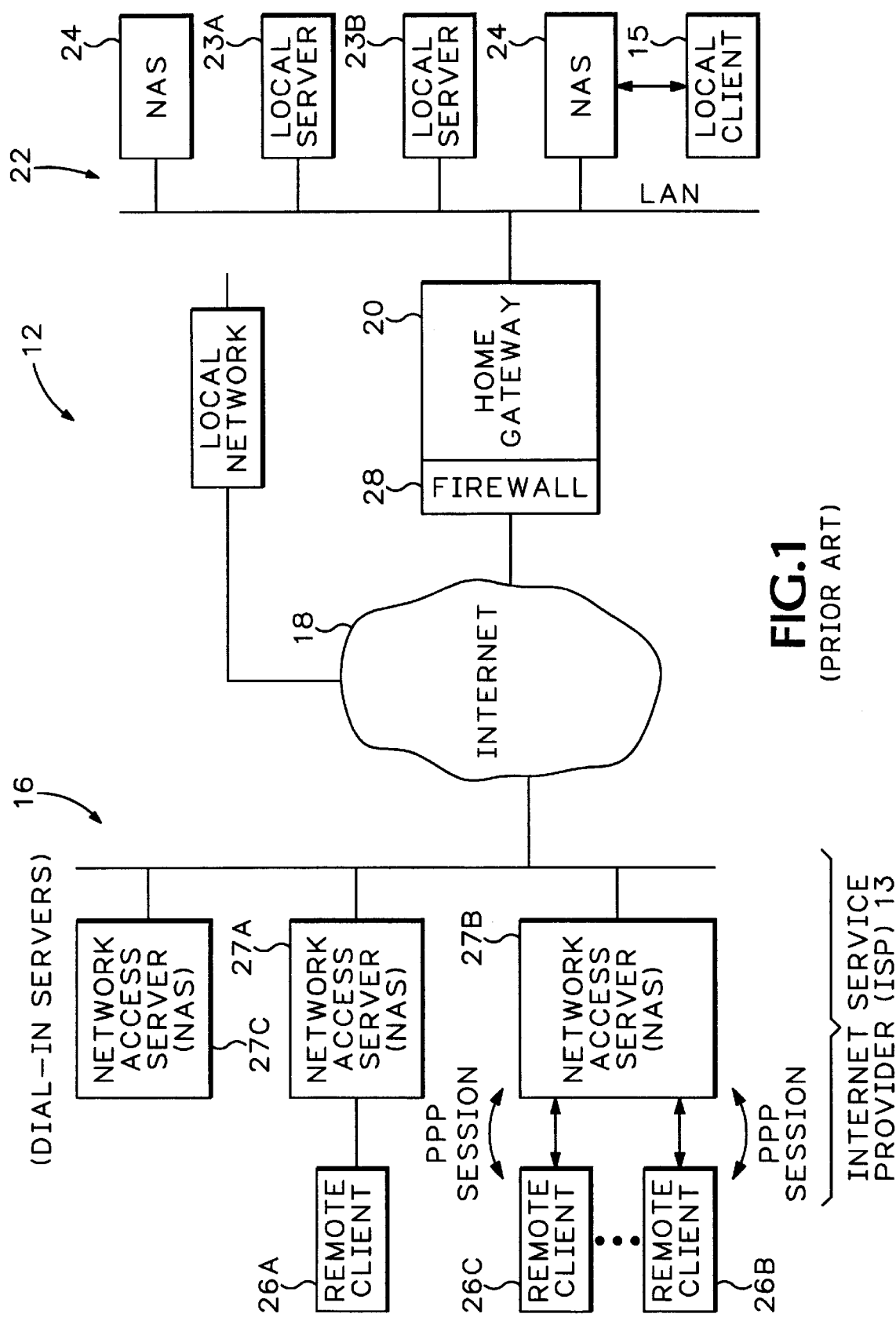
FIG. 1 is a prior art diagram of an internet system.

Any one of the remote clients 26A–26C can access LAN 22 through a virtual dial-up session according to the invention. For simplicity, the invention will only be described for remote client 26B. During the virtual dial-up session, the remote client 26B appears as a direct dial-up client to home gateway 20. Thus, remote client 26B can access any of the resources on LAN 22 through the internet service provider NAS 27B. Since the remote client 26B can access resources from NAS 27B, the company operating LAN 22 is not required to purchase and maintain private NASs 24 (FIG. 1). Because remote client 26B can utilize NAS 27B, long distance calls do not have to be made to a dial-up server located on LAN 22.

The virtual dial-up session uses a L2F protocol to forward a point-to-point link level session (e.g., PPP/SLIP 34) from the NAS 27B to home gateway 20. The PPP/SLIP session 34 is encapsulated in L2F 29 and then transmitted from NAS 27B, through internet 18, to home gateway 20. The home gateway uses the L2F protocol 29 to verify that remote client 26B is an authorized user for LAN 22 and to establish a tunnel 33 between NAS 27B and home gateway 20. After verification and tunnel establishment, L2F 29 forwards a direct link level session, such as LCP, between remote client 26B and home gateway 20.

Figure 3:
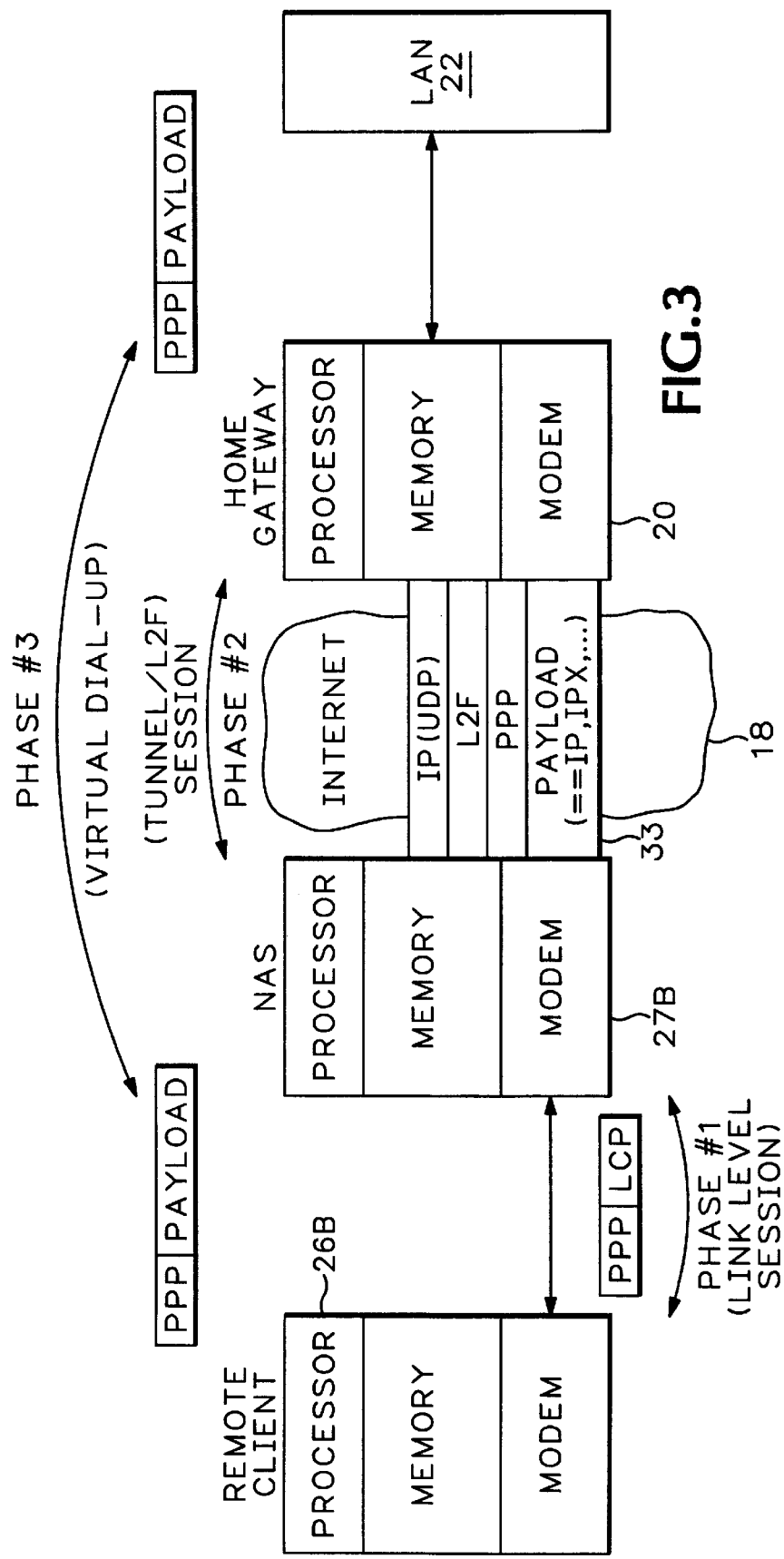
FIG. 3 is a diagram showing different phases of the virtual dial-up session.

Referring to FIG. 3, the remote client 26B in one embodiment, comprises a personal computer having a processor, memory and a modem. The remote client 26B initially dials up a local telephone number for dialing into NAS 27B. NAS 27B includes a processor, memory and a modem for receiving and processing data transmitted from the remote client 26B. In order to establish communications over the point-to-point link between remote client 26B and NAS 27B, each end of the PPP link must first send LCP packets to configure and test the data link.

The NAS 27B uses a modem or a router (not shown) to connect into internet 18. Software in NAS 27B encapsulates the PPP session in L2F. Using existing protocols, such User Datagram Protocol (UDP) and Internet Protocol (IP), NAS 27B creates the tunnel 33 through the internet 18 that carries the L2F packet to home gateway 20. The home gateway 20 includes a processor, memory and a modem that connects to internet 18.

A two step authentication protocol is conducted. The NAS 27B and the home gateway 20 first perform a bidirectional authentication and then the remote client 26B authenticates. If the remote client 26B is authenticated as an authorized client for LAN 22, a tunnel connection is made between NAS 27B and home gateway 20 and the virtual dial-up session is established. The L2F encapsulated PPP packet is then tunneled from NAS 27B to home gateway 20.

Remote client 26B and home gateway 20 are then free to negotiate NCPs for each protocol. After the PPP session between remote client 26B and home gateway 20 is established via tunnel 33, remote client 26B is free to access resources in LAN 22 without restrictions from the firewall 28 in home gateway 20 (FIG. 2).

Remote Client/NAS Point-to-Point Protocol Session

Figure 4:
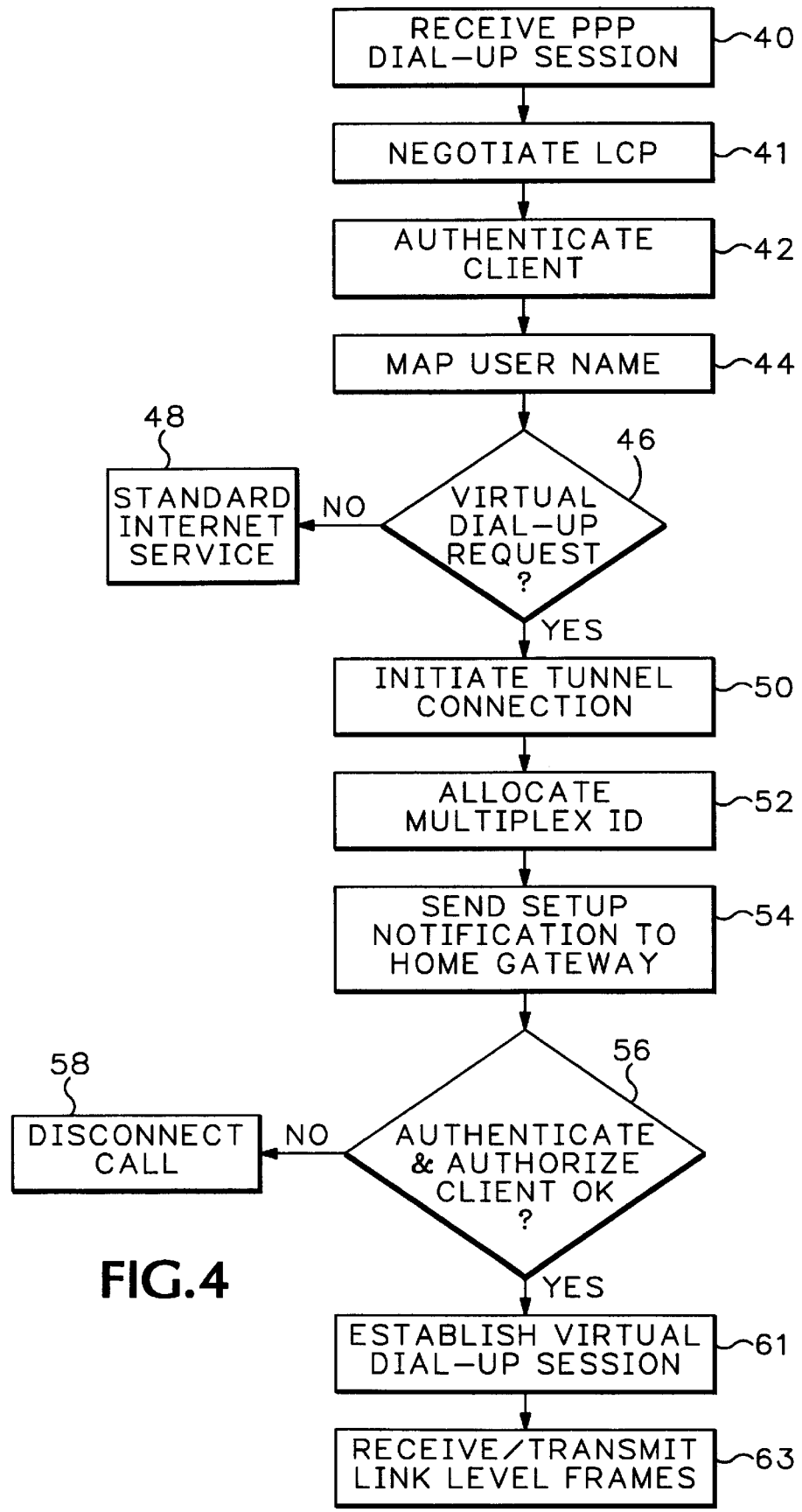
FIG. 4 is a step diagram showing steps performed by the network access server when establishing a virtual dial-up session.

FIG. 4 is a step diagram describing the initial dial-up session between remote client 26B and NAS 27B previously shown in FIGS. 2 and 3. The remote client 26B initiates a PPP connection 34 (FIG. 2) to NAS 27B in step 40. The NAS 27B accepts the connection and the PPP link is established. LCP is negotiated in step 41.

An authentication process is initiated between the NAS 27B and the client 26B using an authentication protocol such as CHAP in step 42. The NAS 27B pursues authentication to the extent required to discover the remote client's apparent identity, and by implication, the desired home gateway 20. Point-to-point protocols such as PPP/SLIP and authentication protocols, such as CHAP, are well-known to those skilled in the art and are, therefore, not explained in detail.

A username field is interpreted by NAS 27B in step 44 to determine whether virtual dial-up service is required. The username is either structured (e.g., bill@localnet.com) or the NAS 27B maintains a database mapping users to services. In the case of virtual dial-up, the mapping will name a specific endpoint, the home gateway 20. If a virtual dial-up service is not required, standard access to the internet 18 is provided in step 48.

When step 46 determines a virtual dial-up is requested (i.e., the apparent remote client identity is determined), step 50 initiates a tunnel connection to the home gateway 20 using the authentication information gathered by the NAS 27B in step 42. If a tunnel 33 is already initiated between the NAS 27B and home gateway 20, a slot in the tunnel 33 is allocated for the remote client 26B. Tunneling is provided by an existing protocol such as (UDP), Frame Relay permanent virtual connections (PVCs), or X.25 virtual connections described in detail in the following request for comments (RFCs) UDP=RFC 768, IP=RFC 791, Frame Relay=RFC 1490.

Once the tunnel 33 exists, an unused multiplex ID (MID) is allocated, in step 52 and a set-up notification packet (see FIG. 5) is sent to notify the home gateway 20 of the new dial-up session. The NAS 27B waits for the home gateway 20 either to accept or reject the set-up notification in step 56. Rejection can include a reason indication, which is displayed to the remote client 26B. After the rejection is displayed, the call from NAS 27B to home gateway 20 is disconnected in step 58. If the client is authenticated and authorized, the virtual dial-up session is established in step 61. Link level frames are then received and transmitted between the two endpoints in step 63.

Figure 5:
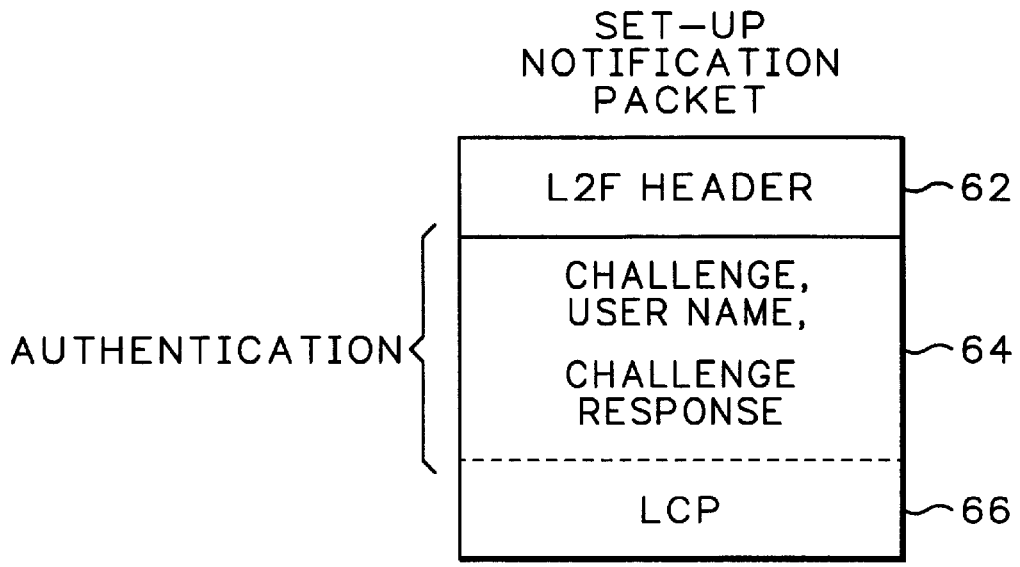
FIG. 5 is a diagram showing a data structure for a layer two forwarding protocol set-up notification packet.

Referring to FIG. 5, a set-up notification packet 62 includes a L2F header 62, authentication data 64 and LCP data 66. The packet 62 is used by the home gateway 20 to authenticate the remote client and to decide whether to accept or decline the tunnel connection. In the case of CHAP, the set-up notification packet authentication data includes a random number challenge, username and password. For PAP or text dialog (i.e., for SLIP users), the authentication information 64 includes username and clear text password. The home gateway 20 can use this information to complete remote client authentication, avoiding an additional cycle of authentication.

To initiate a PPP session between the remote client 26B and the home gateway 20, the set-up notification packet includes a copy of LCP parameters 66 for the completed LCP negotiation between remote client 26B and NAS 27B (FIG. 3). The home gateway 20 may use this information to initialize its own PPP state avoiding additional LCP negotiation. The home gateway 20 may alternatively choose to initiate a new LCP exchange with remote client 26B.

Figure 6:
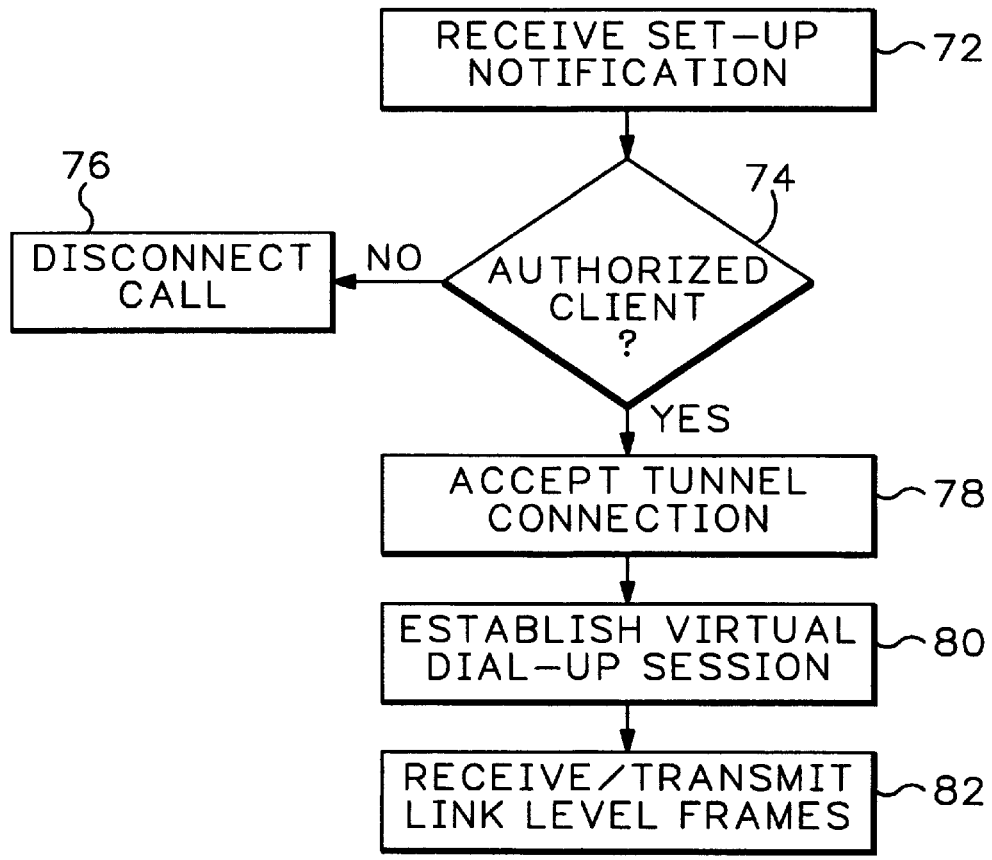
FIG. 6 is a step diagram showing steps performed by a home gateway when establishing the virtual dial-up session.

Referring to FIG. 6, the home gateway 20 receives the set-up notification packet 62 sent from the NAS 27B in step 72. The home gateway 20 conducts remote client authorization in decision step 74. If the client is not in the home gateway 20 local database (FIG. 3), the tunnel slot between NAS 27B and home gateway 20 is disconnected in step 76. If the remote client is validated as an authorized user, home gateway 20 accepts the tunnel connection in step 72. A "virtual interface" is established for SLIP or PPP in step 80. The virtual interface is established in a manner analogous to a direct-dialed connection. With the "virtual interface" in place, link level frames are passed over the tunnel in both directions in step 82.

Figure 7:
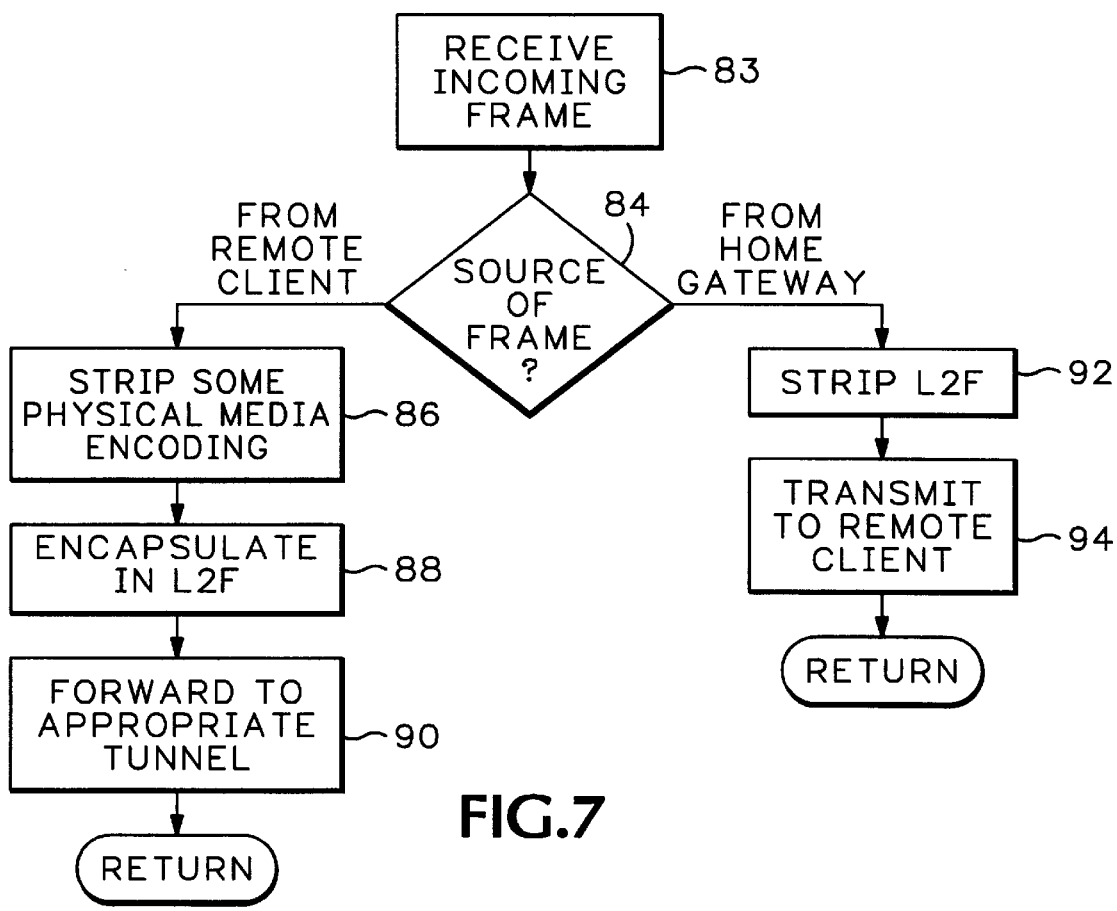
FIG. 7 is a step diagram showing operation of the network access server during the virtual dial-up session.

Referring to FIG. 7, after the virtual dial-up session is established, frames are received at the NAS 27B in step 83. If NAS 27B receives information from remote client 26B, the frames are stripped of any link framing or transparency bits or bytes (physical media encoding) in step 86, encapsulated in L2F in step 88, and forwarded over the appropriate tunnel slot to home gateway 20 in step 90. The home gateway 20 accepts these franes, strips L2F, and processes them as normal incoming frames for the appropriate interface and protocol.

The home gateway 20 encapsulates packets sent to NAS 27B in L2F. In step 84, the NAS 27B determines the data is coming from the tunnel slot connected to the home gateway 20. The frame is stripped of L2F in step 92 and transmitted out its physical interface (e.g., modem) to the remote client 26B in step 94.

The connectivity between remote client 26B and home gateway 20 is a point-to-point PPP or SLIP connection whose endpoints are the remote client's networking application on one end and the termination of this connectivity into the home gateway's SLIP or PPP virtual interface on the other end. Because the remote client becomes a direct dial-up client of the home gateway access server, client connectivity can now be managed by the home gateway 20 with respect to further authorization, protocol access, and filtering. Accounting can be performed at both the NAS 27B as well as the home gateway 20.

Because the L2F set-up notification packet 62 for PPP remote clients contain sufficient information for the home gateway 20 to authenticate and initialize an LCP state machine 23, it is not required that the remote client 26B be queried a second time for CHAP authentication, nor that the client undergo multiple rounds of LCP negotiation and convergence. Thus, connection set-up between the remote client 26B and home gateway 20 is optimized and transparent.

Addressing

There are several significant differences between standard internet access service and the virtual dial-up service with respect to authentication, address allocation, authorization and accounting. The mechanisms used for virtual dial-up service coexist with the internet protocol's traditional mechanisms and allow the NAS 27B to simultaneously service standard ISP clients as well as virtual dial-up clients.

For an internet service, an IP address may be allocated to the remote client dynamically from a pool of service provider addresses. Thus, the remote user has little or no access to their home network's resources, due to firewalls and other security policies applied by the home network to accesses from external IP addresses.

For L2F virtual dial-up, the home gateway 20 exists behind the home firewall and allocates addresses which are internal to the home LAN 22. Such addresses need not be IP addresses. Because L2F is tunneled exclusively at the frame level, the policies of such address management protocols are irrelevant for correct virtual dial-up service; for all purposes of PPP or SLIP protocol handling, the dial-up user appears to have connected at the home gateway 20.

Remote Client Authentication

The authentication of the remote client occurs in three phases; the first authentication phase occurs at the ISP, and the second and optional third authentication phase occurs at the home gateway 20.

The ISP uses the username to determine that a virtual dial-up service is required and initiates the tunnel connection to the appropriate home gateway 20. Once a tunnel is established, a new multiplex ID is allocated and a session initiated by forwarding the gathered authentication information.

The home gateway 20 undertakes the second phase by deciding whether or not to accept the connection. The connection indication may include CHAP, PAP, or textual authentication information. Based on this information, the home gateway 20 may accept the connection, or may reject it (for instance, it was a PAP request and the username/password are found to be incorrect). Once the connection is accepted, the home gateway 20 is free to pursue a third phase of authentication at the PPP or SLIP level such as proprietary PPP extensions, or textual challenges carried via a TCP/IP telnet session.

Figure 8:
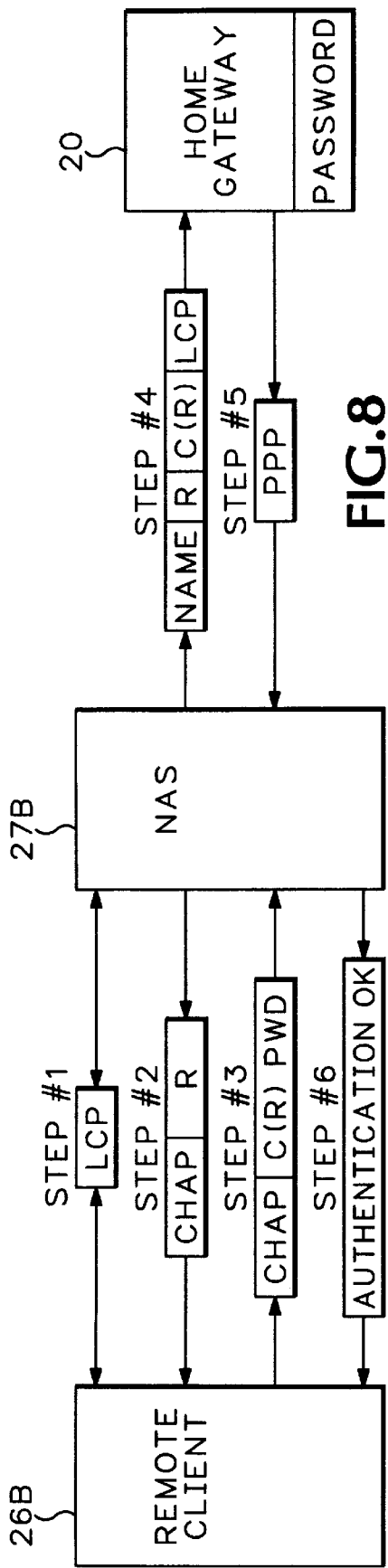
FIG. 8 is a diagram showing the authentication protocol conducted during the layer two forwarding protocol.

FIG. 8 is a diagram showing the authorization steps conducted while establishing a virtual dial-up session. In step 1, various link level protocols such as LCP are used to initially negotiate bidirectionally between the remote client 26B and the NAS 27B. In step 2, a challenge such as CHAP is transmitted from NAS 27B to the remote client 26B. During the challenge, the NAS 27B sends a random number (R) to remote client 26B.

In step 3, the remote client encrypts the random number R based on a remote client password (pwd). The password is a shared secret between remote client 26B and home gateway 20. The encrypted random number cannot be authenticated by the NAS 27B. Thus, if the remote client 26B dials up to the wrong location and responds, the dial-up server will not receive any password information that can be used for unauthorized access to the local network. The encryption of R according to the password (C(R)pwd) is conducted using an existing encryption algorithm such as CHAP which is known to those skilled in the art. The remote client name, and the encrypted random number are transmitted back to NAS 27B.

In step 4, based on the remote client name, the NAS 27B establishes a tunnel to home gateway 20. The NAS 27B transmits the remote client name, the random number, the encrypted random number C(R)pwd and the LCP session through the tunnel to the home gateway 20. The home gateway 20 then independently encrypts the random number R according to the client password which is prestored in the home gateway database. If the random number encrypted by the home gateway 20 matches the random number encrypted by the remote client 26B, an authentication okay is sent in step 6 from the NAS 27B to remote client 26B. A virtual interface is established on home gateway 20 to represent the connection to remote client 26B. An optional authorization step 5 can be conducted in a PPP session between remote client 26B and home gateway 20.

Accounting

The home gateway 20 can decline a connection based on the authentication information collected by the NAS 27B. Accounting can easily draw a distinction between a series of failed connection attempts and a series of brief successful connections. Because authentication is conducted before allowing the tunnel connection, spurious connection costs will be prevented by remote clients failing the authentication session.

Since virtual dial-up is an access service, accounting of connection attempts (in particular, failed connection attempts) is important. The home gateway 20 can accept new connections based on the authentication information gathered by the NAS 27B with corresponding logging. For cases where the home gateway 20 accepts the connection and then continues with further authentication, the home gateway 20 might subsequently disconnect the client. For such scenarios, the disconnection indication back to the NAS 27B may also include a reason.

L2F Protocol Definition

The layer two forwarding protocol (L2F) used during a virtual dial-up session operates as follows.

The NAS 27B and the home gateway 20 each have software that provide a common understanding of the L2F encapsulation protocol so that SLIP/PPP packets can be successfully transmitted and received across the internet 18. The PPP/SLIP packets are encapsulated within L2F. The encapsulated packet is the same packet as it would be transmitted over a physical link. The entire encapsulated packet includes a L2F header, payload packet for SLIP or PPP and an optional Checksum.

Figure 9:
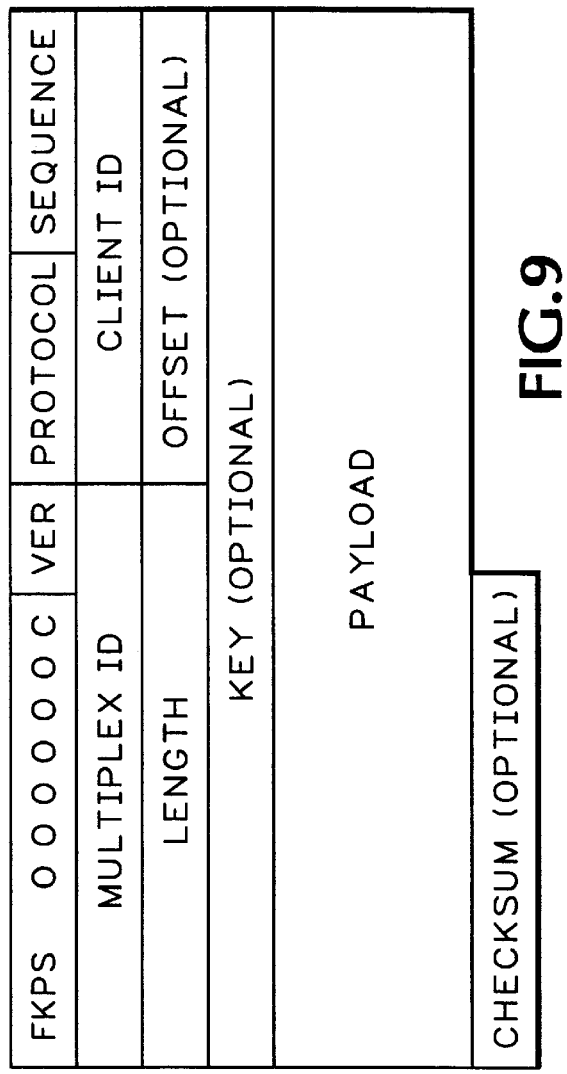
FIG. 9 is a diagram of the data structure for the layer two forwarding protocol.

FIG. 9 is a detailed diagram showing the data structure of the L2F packet.

Version Field

The Ver ("Version") field represents the major version of the L2F software creating the L2F packet.

If any bits are non-zero after bit S, but before bit C, an implementation must discard the packet and initiate disconnect of the entire tunnel. This would correspond to a packet containing extensions not understood by the receiving end. Handling of the "Key" field must be taken in preference to this processing, to avoid denial-of-service attacks. Bit P is used for priority status and bit S is used for sequence numbering.

Protocol Field

The protocol field ("PROTOCOL") specifies the protocol carried within the L2F packet. Legal values (represented here in hexadecimal) are:

| Value | Type | Description |
| --- | --- | --- |
| 0x00 | L2F_ILLEGAL | Illegal |
| 0x01 | L2F_PROTO | L2F management packets |
| 0x02 | L2F_PPP | PPP tunneled inside L2F |
| 0x03 | L2F_SLIP | SLIP tunneled inside L2F |

Sequence Number

The Sequence number starts at 0 for the first L2F packet under a tunnel. Each subsequent packet is sent with the next increment of the sequence number. The sequence number is, thus, a free-running counter represented by modulo 256. For non-L2F management packets, the sequence number is transmitted as 0 and does not increment the local sequence counter, and does not affect the processing of received traffic. For L2F management packets, the sequence number is used to protect against duplication of packets, as follows:

The receiving side of the tunnel records the sequence number of each valid L2F packet it receives. If a received packet appears to have a value less than or equal to the last-received value, the packet must be silently discarded. Otherwise, the packet is accepted and the sequence number in the packet is recorded as the latest value last received.

For purposes of detecting duplication, a received sequence value is considered less than or equal to the last-received value if its value lies in the range of the last value and its 127 successor values. For example, if the last-received sequence number is 15, packets with sequence numbers 0 through 15, as well as 144 through 255, would be considered less than or equal to, and would be silently discarded. Otherwise it would be accepted.

Multiplex ID

The Multiplex ID ("MID") identifies a particular connection within the tunnel. Each new connection is assigned a MID currently unused within the tunnel. The MID cycles through the entire 32-bit namespace, to reduce aliasing between previous and current sessions. The MID with value 0 is special; it is used to communicate the state of the tunnel itself, as distinct from any connection within the tunnel.

Client ID (CLID)

The Client ID is used to assist endpoints in demultiplexing tunnels when the underlying point-to point substrate lacks an efficient or dependable technique for doing so directly. Using CLID, it is possible to demultiplex multiple tunnels whose packets arrive over the point-to-point media interleaved, without requiring media-specific semantics.

When transmitting a L2F_CONF message (described below), a peer's CLID must be communicated via an assigned_CLID field. This must be a unique non-zero value on the sender's side, which is to be expected in all future non-L2F_CONF packets received. The CLID value from the last valid L2F_CONF message received should be recorded and used as the CLID field value for all subsequent packets sent to the peer. Packets with an unknown CLID are silently discarded.

For the initial packet sent during tunnel establishment, where no L2F_CONF has yet been received, the CLID field is 0. Thus, during L2F_CONF, each side is told its CLID value. All later packets sent and tagged with this CLID value, serve as a tag which uniquely identifies this peer.

Length

Length is the size in octets of the entire L2F packet, including header, all fields present, and payload. Length does not reflect the addition of the Checksum, if one is present. The L2F packet is silently discarded if the received packet is shorter than the indicated length. Additional bytes presented in the packet beyond the indicated length are ignored.

Packet Checksum

The Checksum is present if the C bit is present in the header flags. It is a 16-bit CRC as used by PPP/HDLC. It is applied over the entire packet starting with the first byte of the L2F flags, through the last byte of the payload data Payload Offset The Offset is present if the F bit is set in the header flags. This field specifies the number of bytes past the header at which the payload data is expected to start. If it is 0 or if the F bit is not set, the first byte following the last byte of the L2F header is the first byte of payload data.

Packet Key

The Packet Key is the authentication response last given to the peer during tunnel creation. It serves as a key during the life of a session to resist attacks based on spoofing. If a packet is received in which the Key does not match the expected value, the packet is silently discarded.

L2F Tunnel Establishment

When the point-to-point link is first initiated between the NAS 27B and the home gateway 20, the endpoints communicate on MID 0 prior to providing general L2F services to clients. This communication is used to verify the presence of L2F on the remote end, and to permit any needed authentication.

The protocol for such negotiation is always 1, indicating L2F management. The message itself is structured as a sequence of single octets indicating an option, followed by zero or more further octets formatted as needed for the option.

Normal Tunnel Negotiation Sequence

The establishment sequence is illustrated by a "typical" connection sequence. Detailed description of each function follows, along with descriptions of the handling of exceptional conditions.

Each L2F packet is described as a source→destination on one line, a description of the L2F packet field contents on the next, and the contents of the packet's body on following lines. The exact encoding of octets will be described later.

Note that this example uses the Key option, but does not use the Offset and Checksum options. The Length field would be present, reflecting the actual length of the packets as encoded as an octet stream.

```
1. NAS->GW:
      Proto=L2F, Seq=0, MID=0, CLID=0, Key=0
   L2F_CONF
      Name: NAS_name
      Challenge: RND
      Assigned_CLID: 22
```

The NAS 27B decides that a tunnel must be initiated from the NAS 27B to the home gateway 20 (GW). An L2F packet is sent with the Protocol field indicating that an L2F management message is contained.

Because the tunnel is being initiated, Key is set to 0. The sequence number starts at 0; the MID is 0 to reflect the establishment of the tunnel itself. Since the NAS 27B has not yet received an L2F_CONF, the CLID is set to 0.

The body of the packet specifies the claimed name of the NAS 27B, and a challenge random number (RND) which GW 20 will use in authenticating itself as a valid tunnel endpoint. Assigned_CLID is generated to be a value not currently assigned out to any other tunnel to any other home gateway.

```
2. GW→NAS:
      Proto=L2F, Seq=0, MID=0, CLID=22, Key=C(Rnd)
```

```
2. GW->NAS:
      Proto=L2F, Seq=0, MID=0, CLID=22, Key=C(Rnd)
   L2F_CONF
      Name: GW_name
      Challenge: Rnd2
      Assigned_CLID: 73
```

The home gateway 20 has processed the previous packet and sends a response. The protocol continues to be L2F, with a sequence number 0 (each side maintains its own sequence number for transmissions). MID continues to be 0 to reflect tunnel establishment. CLID reflects the Assigned_CLID field of the L2F_CONF received. The Key is a CHAP-style hash of the random number received; each packet hereafter will reflect this calculated value, which serves as a key for the life of the tunnel.

The body contains the name of home gateway 20 and its own random number challenge and its own Assigned_CLID for the NAS 27B to place in the CLID field of future packets. The CLID is generated in an analogous manner to that of the NAS 27B. After this, all packets received by GW 20 must be tagged with a CLID field containing 73, and all packets sent to the NAS 27B must be tagged with a CLID field containing 22.

```
3. NAS->GW
    Proto=L2F, Seq=1, MID=0, CLID=73, Key=C(Rnd2)
    L2F_OPEN
```

The NAS 27B responds with its Key now set to reflect the shared secret. Like the home gateway 20, the NAS 27B will use this Key for the life of the tunnel.

```
4. GW->NAS
    Proto=L2F, Seq=1, MID=0, CLID=22, Key=C(Rnd)
    L2F_OPEN
```

The home gateway 20 provides closure of the key from the NAS 27B. The tunnel is now available for clients to be established.

Normal Client Negotiation Sequence

This section describes the establishment of a virtual dial-up client on a NAS 27B into a home gateway 20. It assumes a tunnel has been created in the way described above. The client for this example is a PPP client configured for CHAP.

```
1. NAS->GW
    Proto=L2F, Seq=2, MID=1, CLID=73, Key=C(Rnd2)
    L2F_OPEN
        Authen: CHAP
        Client: CHAP-name
        Challenge: Rnd3
        Response: <Value received, presumably C(Rnd3)>
```

The NAS 27B has received a call, tried CHAP with a challenge value of Rnd3, and found that the client responded. The claimed name leads the NAS 27B to believe it was a virtual dial-up client hosted by the home gateway 20. The next free MID is allocated, and the information associated with the CHAP challenge/response is included in the connect notification.

```
2. GW->NAS
    Proto=L2F, Seq=2, MID=1, CLID=22, Key=C(Rnd)
    L2F_OPEN
```

The home gateway 20, by sending back the L2F_OPEN, accepts the client.

```
3. NAS->GW
    Proto=PPP, Seq=0, MID=1, CLID=73, Key=C(Rnd2)
    <Frame follows>
4. GW->NAS
    Proto=PPP, Seq=0, MID=1, CLID=22, Key=C(Rnd)
    <Frame follows>
```

Traffic is now free to flow in either direction as sent by the remote client 27 or any home site on LAN 22 (FIG. 2). The contents of the L2F frames is uninterpreted data such as High Level Data Link Control (HDLC). Data traffic, since it is not the L2F protocol, does not use the Seq field, which is set to 0 in non-L2F messages.

L2F Management Message Types

When a L2F packet's Proto field specifies L2F management, the body of the packet is encoded as zero or more options. An option is a single octet "message type", followed by zero or more sub-options.

Each sub-option is a single byte sub-option value, and further bytes as appropriate for the sub-option.

| Hex Value | Abbreviation     | Description                        |
|-----------|------------------|------------------------------------|
| 0x00      | Invalid          | Invalid message                    |
| 0x01      | L2F_CONF         | Request configuration              |
| 0x01      | L2F_CONF_TYPE    | Type of authentication used        |
| 0x02      | L2F_CONF_NAME    | Name of peer sending L2F_CONF      |
| 0x03      | L2F_CONF_CHAL    | Random # peer challenges with      |
| 0x04      | L2F_CONF_CLID    | Assigned_CLID for peer to use      |
| 0x02      | L2F_OPEN         | Accept configuration               |
| 0x01      | L2F_OPEN_CHAP    | CHAP name received from client     |
| 0x02      | L2F_OPEN_CHAL    | Challenge CHAP client received     |
| 0x03      | L2F_OPEN_RESP    | CHAP challenge response from client |
| 0x04      | L2F_ACK_LCP1     | LCP CONFACK accepted from client   |
| 0x05      | L2F_ACK_LCP2     | LCP CONFACK sent to client         |
| 0x03      | L2F_CLOSE        | Request disconnect                 |
| 0x01      | L2F_CLOSE_WHY    | Reason code for close              |
| 0x02      | L2F_CLOSE_STR    | ASCII string description           |
| 0x04      | L2F_ECHO         | Verify presence of peer            |
| 0x05      | L2F_ECHO_RESP    | Respond to L2F_ECHO                |

L2F Message Type: Invalid

If a message is received with this value, or any value higher than the last recognized option value, the packet is considered invalid. The packet is discarded, and a L2F_CLOSE of the entire tunnel is requested. Upon receipt of a L2F_CLOSE, the tunnel itself may be closed. All other received messages are discarded. An implementation may also close the tunnel after an interval of time appropriate to the characteristics of the tunnel. Invalid sub-option values, even if present under a valid option, are treated as if the entire message type was invalid.

L2F_CONF

The L2F message type is used to establish the tunnel between the NAS 27B and the home gateway 20. MID is always set to 0. The body of such a message starts with the octet 0x01 (L2F_CONF), followed by one or more sub-options.

The L2F_CONF_TYPE sub-option must be present. It is encoded as the octet 0x01, followed by a single byte describing the type of authentication the NAS 27B exchanged with the remote client 26B in detecting the client's claimed identification. The authentication types are:

0x01 Textual username/password exchange

0x02 PPP CHAP

0x03 PPP PAP

The L2F_CONF_NAME sub-option must be present. It is encoded as the octet value 0x02, followed by an octet specifying a non-zero length, followed by the indicated number of bytes, which are interpreted as the sender's ASCII name.

The L2F_CONF_CHAL sub-option must be present. It is encoded as the octet value 0x03, followed by four bytes of challenge value. The challenge value is generated using a random number generator.

The L2F_CONF_CLID sub-option must be present. It is encoded as the octet 0x04, followed by four bytes of Assigned_CLID value. The Assigned_CLID value is generated as a non-zero value unique across all tunnels which exist on the sending system.

The CLID field is sent as 0 when a L2F_CONF packet is received from the peer. After this, the Assigned_CLID value of the last L2F_CONF packet received must be placed in the CLID of all packets being sent. When sent from a NAS to a home gateway, the L2F_CONF is the initial packet in the conversation. Key is set to 0, since no challenge has been received yet.

When sent from the home gateway 20 to the NAS 27B, a L2F_CONF indicates the home gateways recognition of the tunnel creation request. The home gateway 20 must provide its name and its own challenge in the message body. Key must be set to the CHAP-style hash of the received challenge bytes.

L2F_OPEN

The L2F_OPEN message is used to establish a client connection within a tunnel previously established by L2F_CONF messages. When sent from the NAS 27B to the home gateway 20, it is used to indicate the presence of a new dial-up client. When sent back from the home gateway 20 to the NAS 27B, it indicates acceptance of the client. This message starts with the octet 0x02. When sent from the NAS 27B, it may contain further sub-options. When sent from the home gateway 20, it may not contain any options.

The L2F_OPEN_CHAP sub-option is encoded as the octet 0x01, followed by an octet specifying the length of the CHAP name received, followed by the indicated number of bytes of CHAP name.

The L2F_OPEN_CHAL sub-option is encoded as the octet 0x02, followed by an octet specifying the length of the CHAP challenge sent, followed by the CHAP challenge itself.

The L2F_OPEN_RESP sub-option is encoded as the octet 0x03, followed by an octet specifying the length of the CHAP response sent, followed by the client's response to the CHAP challenge. This message must be treated as invalid if L2F_OPEN_CHAP, L2F_OPEN_CHAL, and L2F_OPEN_RESP do not all appear within the same message.

The L2F_ACK_LCP1 and L2F_ACK_LCP2 sub-options are encoded as the octets 0x04 and 0x05 respectively, followed in either case by two octets in network byte order specifying the length of the LCP CONFACK last received from or sent to the client. Following these octets is an exact copy of the CONFACK packet.

The home gateway 20 may choose to ignore any sub-option of the L2F_OPEN and accept the connection anyway. The home gateway 20 would then have to undertake its own LCP negotiations and authentication.

L2F_CLOSE

This message is encoded as the byte 0x03. An L2F_CLOSE may be sent by either side of the tunnel at any time. When sent with MID of 0, it indicates the desire to terminate the entire tunnel and all clients within the tunnel. When sent from the home gateway 20 in response to an L2F_OPEN, it indicates that the home gateway 20 has declined the connection. When sent with a non-zero MID, it indicates the termination of that client within the tunnel.

The L2F_CLOSE_WHY sub-option is encoded as the byte 0x01 followed by four bytes in network byte order specifying a bit mask of reasons for the disconnection. The bits are encoded as:

0x00000001 Authentication failed
0x00000002 Out of resources
0x00000004 Administrative intervention
0x00000008 User quota exceeded
0x00000010 Protocol error
0x00000020 Unknown user
0x00000040 Incorrect password
0x00000080 PPP configuration incompatible Bits in the mark 0xFF000000 are reserved for per-vendor interpretation.

An implementation can choose to not provide status bits even if it detects a condition described by one of these bits. For instance, an implementation may choose to not use 0x00000020 due to security considerations, as it can be used to prove user name space.

The L2F_CLOSE_STR sub-option is encoded as the byte 0x02, followed by a two-byte length in network byte order, followed by the indicated number of bytes, which are interpreted as descriptive ASCII text associated with the disconnection. This string may be ignored, but could be recorded in a log to provide detailed or auxiliary information associated with the L2F_CLOSE.

L2F_ECHO

Transmission of L2F_ECHO messages are optional. If an implementation transmits L2F_ECHO messages, it must not transmit more than one such request each second. The payload size must be 64 bytes or less in length.

The L2F_ECHO message is encoded as the single byte 0x04. It can be sent by either side once the tunnel is established. MID must be 0. An L2F_ECHO_RESP must be sent back in response.

L2F_ECHO_RESP

All implementations respond to L2F_ECHO, using L2F_ECHO_RESP. The received packet is sent back verbatim, except that the CLID, sequence number, and Checksum (if any) must be updated, and the L2F_ECHO message type changed to an L2F_ECHO_RESP. Payload data following the 0x04 octet, if any, must be preserved in the response.

When an L2F_ECHO_RESP is received, the payload data may be used to associate this response with a previously sent L2F_ECHO, or the packet may be silently discarded.

L2F Message Delivery

L2F is designed to operate over point-to-point unreliable links. It is not designed to provide flow control of the data traffic, nor does it provide reliable delivery of this traffic; each protocol tunnel via L2F is expected to manage flow control and retry itself. Thus, it is only L2F control messages which must be retransmitted; this process is described in this section.

Sequenced Delivery

All L2F control messages (i.e., those L2F packets with a protocol type of 0x01) are transmitted with a sequence number. The sequence number is a per-L2F tunnel free-running counter which is incremented (modulo 256) after each packet is transmitted. It is used to permit the receiving end to detect duplicated or out-of-order packets, and to discard such packets.

Because L2F in operation carries uninterpreted frames, it permits operation of features without explicit knowledge of these features. For instance, if a PPP session is carried, L2F is simply transporting HDLC frames. The two PPP endpoints can negotiate higher-level features, such as reliable link, compression, multilink, or encryption.

These features then operate between the two PPP endpoints (the dial-up client on one end, and the home gateway 20 on the other), with L2F continuing to simply ship HDLC frames back and forth. For similar reasons, PPP echo requests, NCP configuration negotiation, and even termination requests, are all simply tunneled HDLC frames.

Termination

As L2F simply tunnels link-level frames, it does not detect frames like PPP TERMREQ. L2F termination in these scenarios is driven from a protocol endpoint; for instance, if a home gateway 20 receives a TERMREQ, its action will be to "hang up" the PPP session. The L2F implementation at the home gateway 20 converts a "hang up" into a L2F_

CLOSE action, which will shut down the client's session in the tunnel cleanly. L2F_CLOSE_WHY and L2F_CLOSE_STR may be included to describe the reason for the shut-down.

Extended Authentication

L2F is compatible with both PAP and CHAP protocols. SLIP does not provide authentication within the protocol itself, and thus requires an ASCII exchange of username and password before SLIP is started. L2F is compatible with this mode of operation as well.

To the extent the NAS 27B can capture and forward the one-time password, L2F operation is compatible with password cards. For the most general solution, an arbitrary request/response exchange is supported. In a L2F environment, the protocol is structured so that the NAS 27B can detect the apparent identity of the user and establish a tunnel connection to the home gateway 20, where the arbitrary exchange can occur.

The home gateway 20 requires authentication before accepting a connection from NAS 14. Thus, there will not be a spurious run-up of line toll charges since the remote client does not first connect to the private system and then provide an appropriate PPP authentication protocol (e.g., CHAP).

It should also be apparent that many of the L2F operations conducted by NAS 27B could be alternative performed in the remote client 26B. For example, the random number generation, encryption and transmission could be conducted solely by the remote client without interaction by the NAS 27B. Also tunneling negotiations and L2F encapsulation could similarly be conducted in the remote client instead of the NAS 27B.

Stack Group Bidding Protocol

Figure 10:
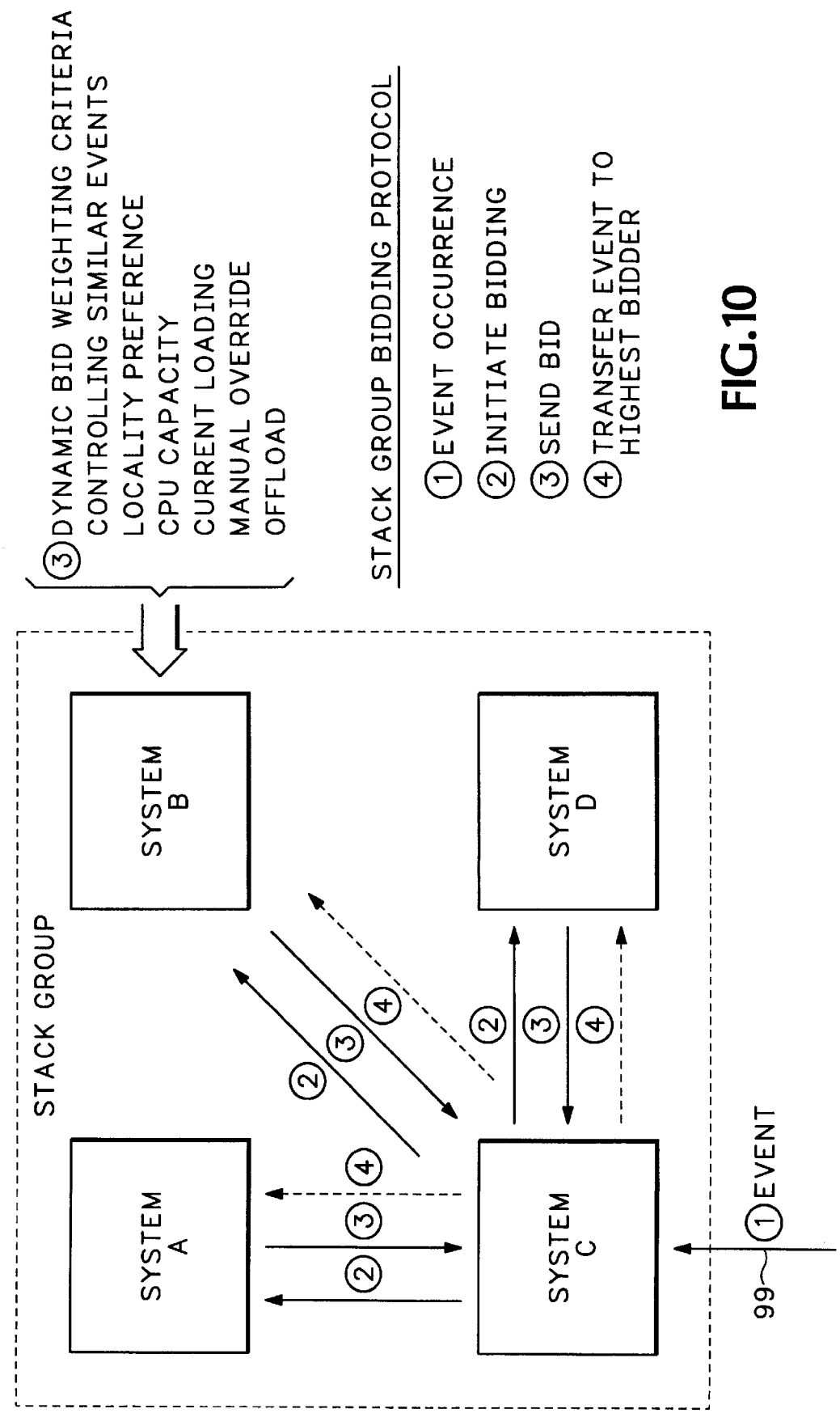
FIG. 10 is a diagram showing a dynamic stack group bidding protocol according to another embodiment of the invention.

FIG. 10 is a block diagram showing a dynamic stack group bidding protocol (SGBP) used by multiple systems A–D. The SGBP includes 2 parts. A first part comprises a SGBP hello session that establishes an infrastructure between members of the stack group. The hello session determines how bidding messages are transported between stack members. A second part comprises the SGBP bidding session that determines which stack group member will handle one or more incoming tasks.

The SGBP takes into account performance capacity for each stack group member and is user tunable. In one example, the systems A, B, C, and D comprise dial-in servers, routers or general purpose computers that receive, route or process network packets. The events bid upon by the stack group members comprise any task that can be distributed to another member of the stack group for further processing. In one example, the events comprise communications links 99 that are established from a remote client When the event (e.g., link 99) occurs in step 1, the system receiving the event (system C), sends out a request for bids in step 2. Each system A, B and D sends a bid back to system C in step 3. System C generates its own bid value locally. Each bid is based on dynamic bid weighting criteria that varies depending on the status of the system at the time the bid request is initiated. For example, the value bid by each system A, B, C and D in step 3 is weighted according to whether the system is already controlling or processing other similar events, locality of the event in relation to the location of the system bidding for the event, CPU capacity of the system, current loading of the system, manual override values and an offload criteria that indicates the system making the bid does not want to process the event.

After receiving all the bids, system C forwards the event to the system making the highest bid. Because the bids are dynamically weighted, the event is given to the system that can process the event most efficiently. For example, system A might be a general purpose computer that has relatively low CPU power in comparison to systems B, C or D. Thus, system A will make a smaller bid than systems B, C or D. Systems B and D might be routers having substantially the same processing power, but more processing power than system C. System B may currently be processing more tasks than system D. Accordingly, system D will make a higher bid than system B or C. System C transfers the event to the system that makes the highest bid. If system C makes the highest bid, the event is processed by system C. Thus, resources are dynamically allocated according to the current status of each resource at the time of the bid request.

Hello Session

Figure 11:
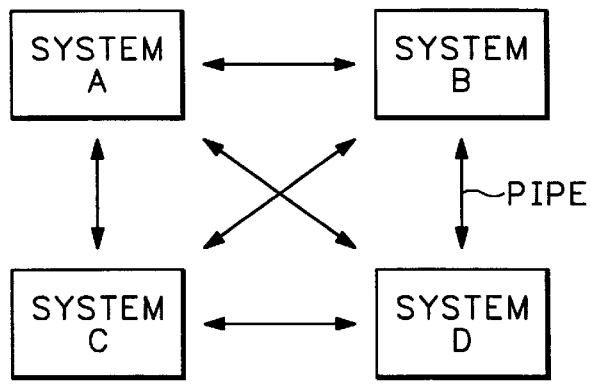
FIG. 11 is a diagram showing a hello protocol used for establishing members in a stack group.

FIG. 11 shows a hello protocol used for building the members of the SGBP stack group. A transport mechanism needs to be established between the stack group members on which the SGBP bidding session will run. The transport mechanism can be a reliable transport or can be a best effort transport. A reliable transport mechanism handles stack group members that go down. If the transport mechanism is best effort, each stack group member runs a keep-alive routine to determine if peers are active. The keep alive transactions provide an up-to-date stack network that processes bid requests without wasting time waiting for a response from a dead stack member.

Each stack group member (Systems A, B, C and D) is connected with every other stack member through a pipe such as a TCP pipe. This creates a N×N fully connected mesh network of stack members. Right after boot-up, a stack member sends a hello challenge message to other stack members. Anytime a stack member is down, a hello challenge message is sent to the down stack member at 20 second intervals. Once, one stack member receives a response from another stack member, the two stack members conduct a 2 way authentication.

Figure 12:
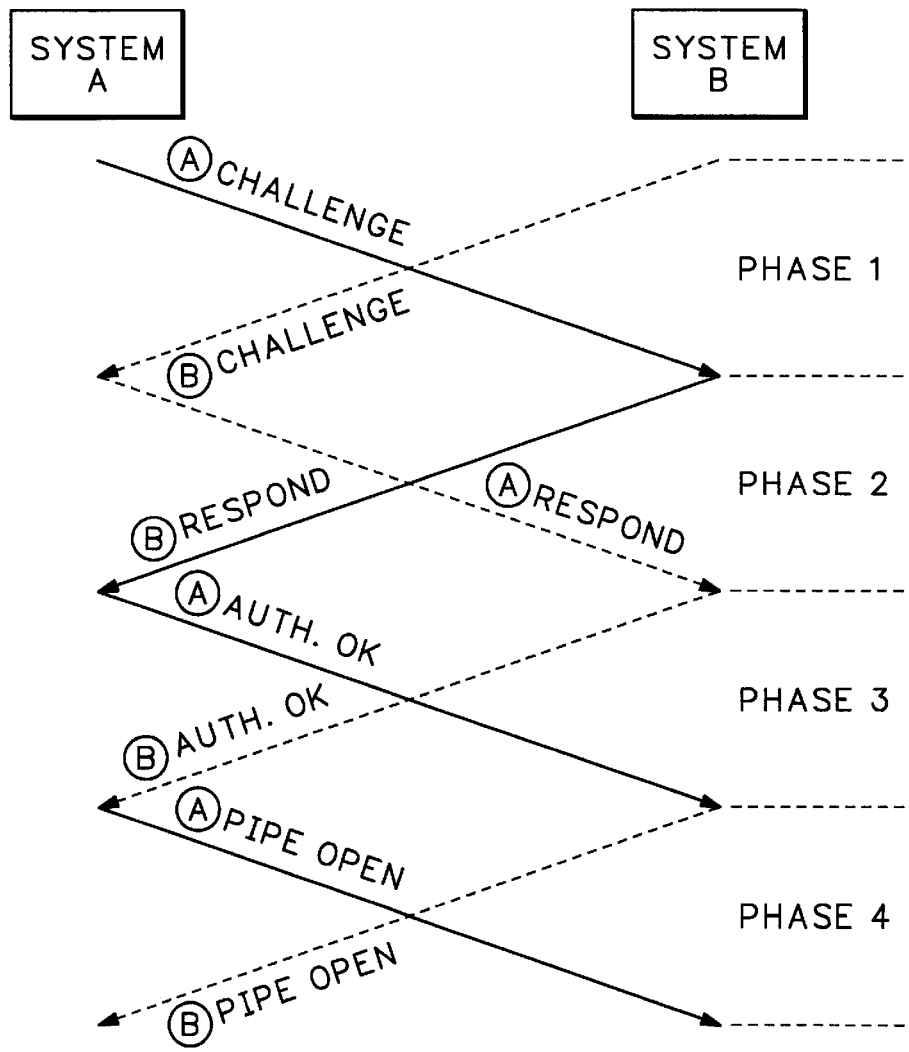
FIG. 12 is a detailed diagram of the hello protocol shown in FIG. 11.

FIG. 12 is a detailed diagram of the hello session used in the SGBP to establish pipes between stack group members. For simplicity, the hello system will only be described for systems A and B. Systems A and B each try to authorize their peers with a two way authorization. Systems A and B send out a challenge message in phase 1 and respond to the challenge message from their peers in phase 2. If there is a match in the challenge, an authorization OK message is sent in phase 3. The peer's address is passed in the authorization OK message. An attempt is made to open a pipe between the two peers in phase 4. The peer with the higher address will initiate the pipe. The peer with the lower address will accept the connection when established by the peer with the higher address.

Bidding Session

The following is a list of bidding values associated with the stack group bidding session. At stack group initialization, each stack group member goes through a CPU calibration. The result is a calibrated value that approximates the CPU power of the stack group member. For example a system having a dedicated routing architecture may have a higher calibrated value than a dial-in server with a more general purpose computer architecture. Every stack member has a default base value for bidding. The default base value is a constant and is the same for every type of stack member, regardless of associated CPU power. Bidding session is described in terms of bidding for links in a multilink PPP (MLP) bundle. However, the events bid for by the stack group members can comprise any task that can be distributed among the stack group members.

Each stack member has a seed bid generally defined as one of the following: Default: Only bid for a local call. If the stack member does not have an incoming call for the bundle, no bid is made for the bundle. If there is an incoming call for the bundle, the stack member bids as follows: default base value–# of active MLP bundles on the stack member. Offload: Stack member bids for the MLP bundle at all times. The stack member bids as follows: default base value+ calibrated value–# of active MLP bundles on the stack member. Manual override: The stack member bids a user provided manual override value as follows: user provided manual override value—# of active MLP bundles on the stack member. Forward-only: Do not bid for any bundle. If stack member has an incoming call and no bidder, it drops the call. Forward-only is typically used by a low CPU power access server that will receive calls and forward to an offload server. See discussion regarding FIG. 15 below.

Figure 13B:
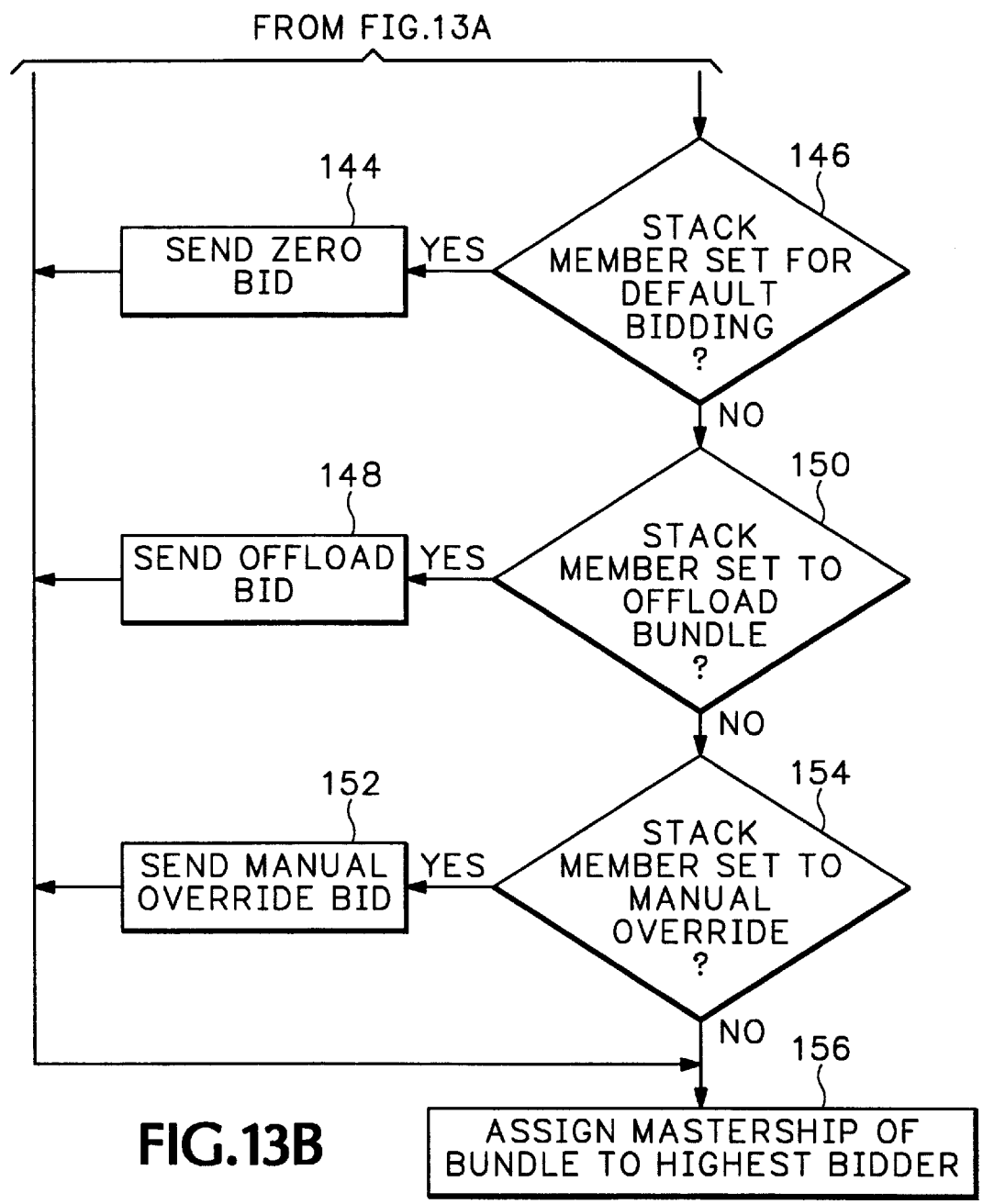
FIG. 13 is a step diagram showing how bids are weighted in the stack group bidding protocol.

FIG. 13 describes the steps conducted during the bidding session of the SGBP. A call (event) occurs at one of the stack group members in step 130. The event could represent establishment of a link that has negotiated MLP. The stack group member receiving the call checks to see if it has mastership of the MLP bundle in decision step 132. If the stack group member has mastership of the bundle, no bidding request is made by the stack group member receiving the call. The call is then added to the MLP bundle. If the stack member does not have mastership of the bundle, the stack member sends a bid request to each stack member in step 134.

Each stack member replies based on the following. If one of the stack members has mastership of the bundle in decision step 138, that stack member sends a mastership claim bid in step 136. If a stack member has a call for the same bundle in decision step 142, a seed bid is sent to the stack member making the bid request in step 140. The seed bid is based on the bidding scheme configured on the stack member: default, offload, manual override, or forward-only. Note that step 142 caters to the case where two stack members receive calls near simultaneously. Both see each other's request for bids and bid as per their configuration. One of the two stack members becomes the arbiter for selecting the master while the other goes into a standby mode (to wait for mastership assignment from the arbiter or to take over as the arbiter in case the other one fails/dies).

Who becomes the arbiter is based on whose bid is higher. If both have bid the same value, then the stack member with a higher ID value becomes the arbiter. The ID value is a globally unique value (within the stack group) that is assigned and passed around by the SGBP hello mechanism so that each stack member knows every other stack member's unique ID.

If a stack member does not have a call for the same bundle in decision step 146 and the stack member is configured for "default bidding", a zero bid is sent to the requesting stack member in step 144. If the stack member is set to offload the bundle in decision step 150, a seed bid is set to offload in step 148. The seed bid is equal to the following: default base value+calibrated value–# of bundles owned by the stack member. If the stack member is set to manual override in decision step 154, a seed bid is sent in step 152 as follows: manual override value–# of bundles owned by stack member.

After receiving all the bids, the bid requester assigns mastership of the bundle to the highest bidder in step 156. If a stack member did not send a bid within a time-out window, the bid requester assumes a bid request of zero. If there are two highest bidders, the bid requester randomly selects one. If the bid requester receives a mastership claim bid, bundle mastership is immediately assigned to the mastership claim bidder and the bidding process terminated.

If all other stack group members have default settings and do not have an incoming call to the bundle, the stack group member receiving the local call wins bundle mastership. If multiple stack group members have local calls, the stack member with the least load (number of active bundles) wins. If there are two stack group members with the highest bids, and the bid requester is one of the highest bidders, the bid requester wins because of locality preference. Otherwise, the bid requester randomly selects one of the two stack members.

A stack group member is configured as an offload server by setting the seed bid to offload. An offload server is the stack group member that receives bundle off-loads from other stack group members. For example, a stack group may include one high performance router and multiple low performance dial-in servers that simply operate as switches for connecting communication links to a local network. The SGBP takes advantage of the higher CPU power of the router architecture by having the router own all the MLP bundles. The router then performs most of the CPU intensive operations, such as, fragmentation and defragmentation of MLP bundles.

If multiple servers have offload settings, the servers operate together to provide load balancing. In the offload setting, the highest CPU power has the highest bidding power. For example, a first and second dial-in server may both be configured as offload servers (i.e. seed bid=offload= default base value+calibrated value–# of active MLP bundles). If neither offload server currently has active MLP bundles, mastership of the bundle attaches to the dial-in server with the highest designated CPU power. However, when a stack member becomes loaded with more active bundles, that stack group member makes less attractive bid offers. Hence, stack group members in a stack group are less likely to become overloaded.

Multichassis Multilink Point-to-Point Protocol

Figure 14:
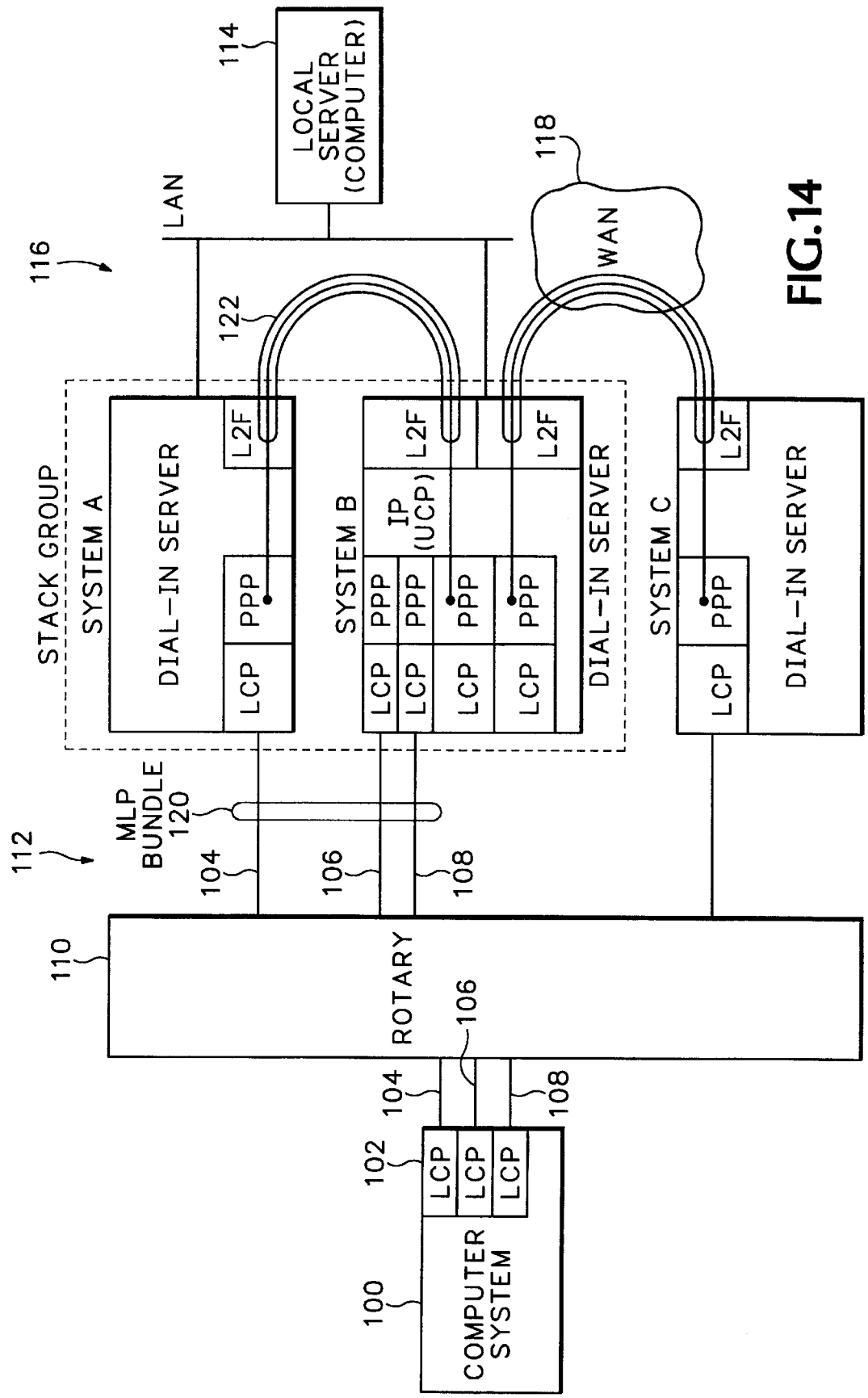
FIG. 14 is a diagram showing a multichassis multilink (MLP) system according to another embodiment of the invention.

Referring to FIG. 14, the SGBP shown in FIGS. 10–13 is used in conjunction with a multilink point-to-point protocol (MLP) to enable processing of links that terminate on different physical systems. A stack group as defined in the context of multichassis MLP is a group of computing systems that operate as a single virtual endpoint. A stack group can include routers, dial-in servers or any general purpose computers capable of processing network packets. A link is defined as a channel or interface established between two end points. A loaned link or forwarded physical link is defined as a link that is loaned out for the duration of a call. A loaner is a stack group member that is loaning out use of its channel or interface. A loanee is a stack group member that is accepting a channel or interface from a loaner. L2F is used in conjunction with multilink PPP (MLP) to forward the links from one stack group member to another.

A computer system 100 includes a modem (not shown) that connects to a rotary 110. The rotary 110 establishes links 112 to different endpoints including systems A, B and C. Systems A, B and C in one embodiment, are dial-in servers coupled together with a local computer 114 through a local area network (LAN) 116. System C is connected to dial-in server B through a WAN 118. Systems A, B and C represent any equipment capable of establishing links with other systems. The systems that comprise a stack group do not have to reside on the same LAN.

The computer system 100 dials into a phone number that establishes a link with one of the dial-in servers A or B through rotary 110. For example, the dial-in call to rotary 110 establishes a PPP link 106 from computer system 100 to dial-in server B. In order to increase communication bandwidth, computer 100 dials into rotary 10 again. A second link 108 is established between computer 100 and dial-in server B.

The computer system 100 is now dialed into two separate links on the dial-in server B. Two separate link control protocol (LCP) states are generated, one LCP state for link 106 and one LCP state for link 108. A conventional multilink point-to-point protocol (MLP) is used to bundle the two links together. For example, frames may be transmitted from computer 100, through dial-in server B and LAN 116 to the local server 114. MLP can send separate fragments of the frames over links 106 and 108 at the same time to increase communication bandwidth.

When there are multiple dial-in servers A and B in a dial-in pool, links might connect to different physical dial-in servers. For example, all links to dial-in server B might currently be in use. An additional link 104 would then necessarily be established between computer system 100 and local client 114 through system A. If systems A and B accept use of MLP from computer 100, links 104, 106 and 108 are logically linked together. Multichassis multilink (MLP) forwards the PPP link 104 to system B. A conventional MLP session is then conducted with the system B serving as the virtual termination point receiving all PPP links in the MLP bundle.

Systems A and B are defined as stack group members. Stack group members may or may not be on the same LAN segment. During the multichassis MLP session, computer system C may be initialized as a stack group member and then forward a link through the WAN 118 to dial-in server B. Any stack group member can take an incoming call by going through an LCP negotiation and authentication phase. If MLP has been negotiated, the stack group member determines if a bundle already exists within a stack group for the new connection. If a bundle exists under the mastership of another member, the link is forwarded to that member via an L2F tunnel. L2F can use different transport protocols for tunneling. A bundle 120 might initially include links 106 and 108. After MLP link 104 is established with system A, the PPP session is forwarded from system A to system B through tunnel 122.

During the MLP session, a remote client (computer 100) can establish multiple links terminated on different access server chassis. Among this group of access servers, only one access server owns the MLP bundle (bundle master). The bundle master performs all the packet fragmentation and de-fragmentation for the bundle. The bundle master also acts as the single point of IO for upper layer protocols. The SGBP is used to determine which stack group member acquires mastership for an MLP bundle and controls addition of links to the bundle.

A stack group member maintains mastership of a bundle managing the "tunnelled" links even if the primary link to that stack group member is disconnected. If dial-in server A is the master of MLP bundle 120, all IP transactions for the MLP bundle are conducted by system A. If link 104 is disconnected, dial-in server A remains master of bundle 120 managing the bundle through tunnel 122.

Figure 15:
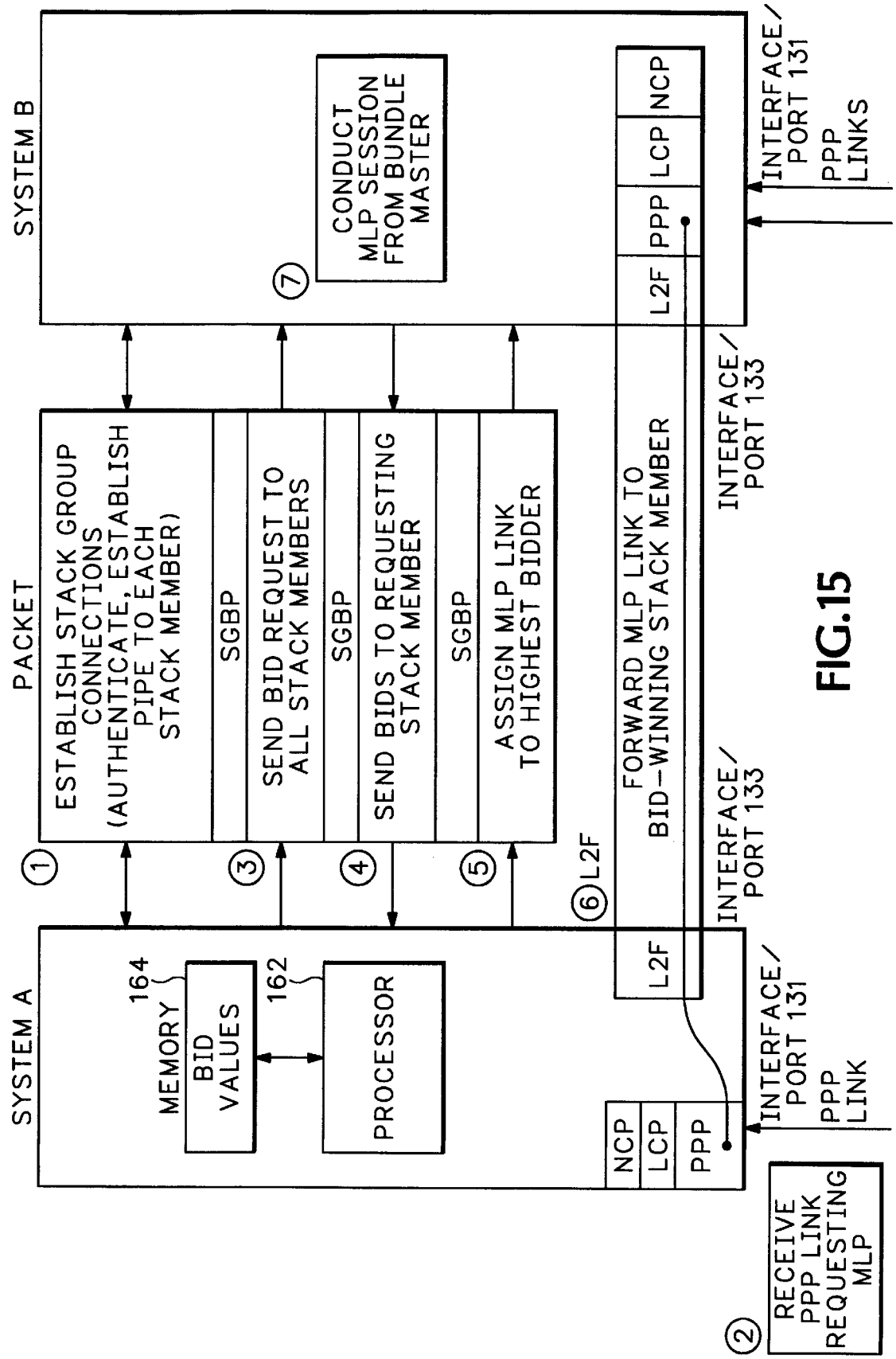
FIG. 15 is a detailed block diagram showing how the stack group bidding protocol is used in the multichassis MLP system.

Referring to FIG. 15, systems A and B (FIG. 14) each include a first interface/port 131 that connects to a remote client such as computer system 100 (FIG. 14). A second interface/port 133 is connected to the LAN 116 (FIG. 14) that connects the two systems A and B together. A processor 162 in each system A and B conducts the SGBP and a memory 164 stores the bid values used during the bidding session.

The SGBP decides which stack group member owns the bundle for an incoming call. In step 1, the SGBP hello session transmits packets between each system that could be part of the stack group. In one example, UDP packets are transmitted between each system. The hello session establishes reliable pipes between each stack group member. For example, TCP pipes or UDP pipes could be established. Step 2 shows an incoming PPP link received by system A that requests MLP during LCP. In response to the incoming call, system A in step 3 sends a bid request to all stack members via the pipes established in the hello session. The stack members send bids back to system A in step 4. In step 5, system A assigns ownership of the bundle to the highest bidder. If there are two stack members that have equally high bids, one of the two stack members is randomly selected as master. If system A is the highest bidder, it will win on a locality preference since it has the physical link.

Once a stack member wins the mastership of the bundle, all the subsequent incoming calls are forwarded to the bundle master. For example, when system B is the highest bidder it becomes bundle master. In turn, system A forwards PPP links in the MLP bundle to system B via an L2F tunnel. As bundle master, system B performs (de)fragmentation of data into packets and routes the packets to identified packet addresses.

Figure 16:
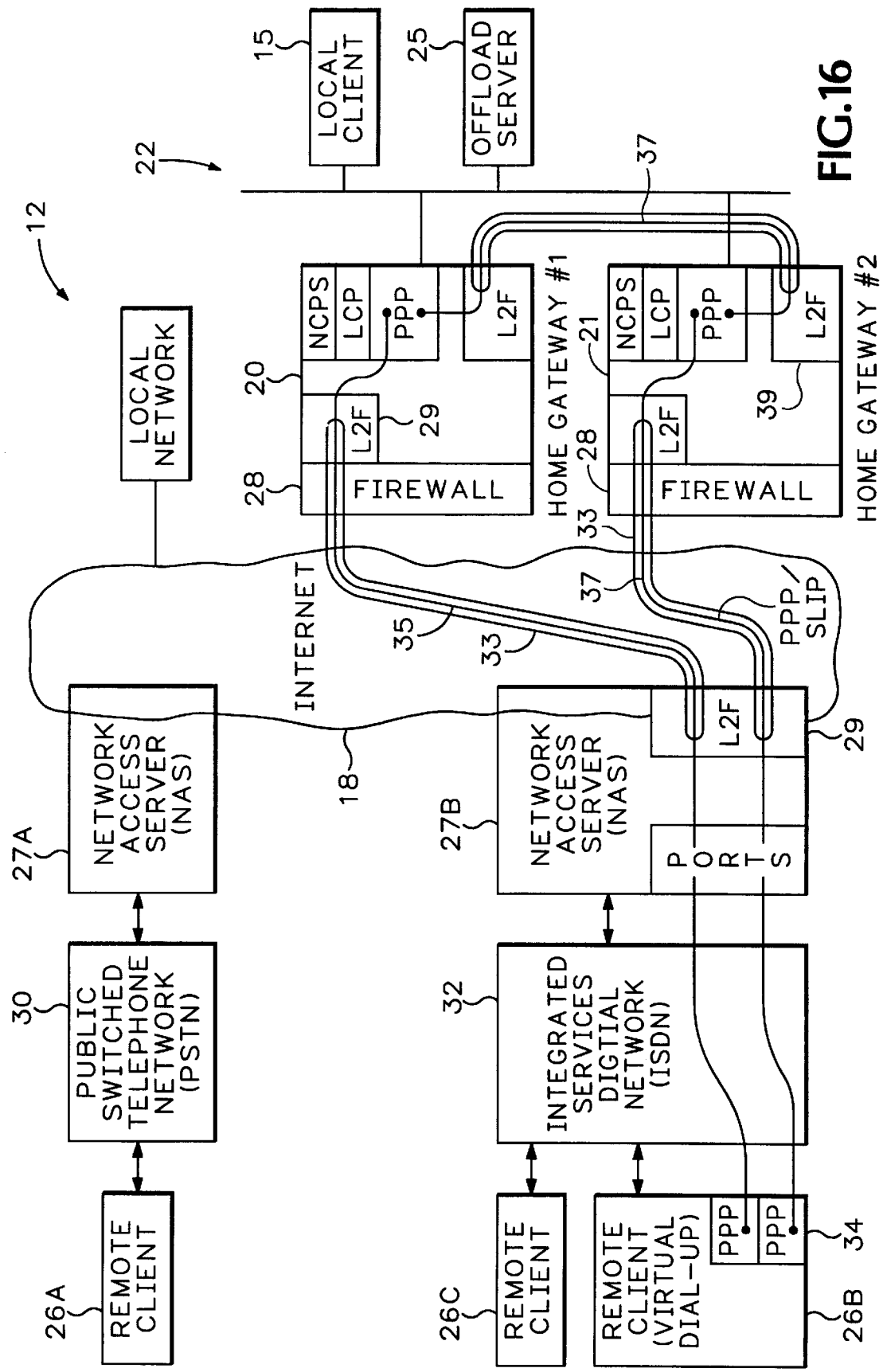
FIG. 16 is a diagram showing another embodiment of the multichassis MLP system.

Referring to FIG. 16, another embodiment of the multichassis MLP conducts MLP sessions with remote clients 26A–26C in a system similar to that previously shown in FIG. 2. At least one local client 15 and an offload server 25 are connected to internet 18 through two different home gateways 20 and 21. Each home gateway includes a firewall 28. A MLP session can be conducted by any of the remote clients 26 through PSTN 30 or ISDN 32. For clarity, multichassis MLP will be described only for remote client 26B.

Home gateways 20 and 21 might comprise simple switches that simply serve as termination points for the links 35 and 37. The offload server 25 is defined as any system that can be delegated the task of processing packets received through the home gateways 20 and 21. The offload server 25 in one embodiment is a network router. Offload server 25 does not provide any direct termination points for link 33 or link 35. Multichassis MLP allows the computationally intensive task of packet routing to be offloaded to the offload server 25. The offload server 25 gains mastership to the links 35 and 37 by making a higher bid than home gateways 20 or 21.

Remote client 26B accesses LAN 22 through the L2F virtual dial-up session as described above in FIG. 2. During the virtual dial-up session, the remote client 26B appears as a direct dial-up client to home gateways 20 and 21 Thus, remote client 26B can access any of the resources on LAN 22 through the internet service provider NAS 27B. The PPP sessions 34 are encapsulated in L2F and then transmitted from NAS 27B, through internet 18, to home gateways 20 and 21.

The home gateways 20 and 21 use the L2F protocol to verify that remote client 26B is an authorized user for LAN 22 and to establish tunnels 33 between NAS 27B and home gateways 20 and 21. After verification and tunnel establishment, L2F is used to conduct a direct link level session, such as LCP, between remote client 26B and home gateways 20 and 21. The LCP session is used to establish MLP with multiple PPP links. Multichassis MLP is then used to forward PPP links terminating on different endpoints to the same system.

For example, remote client 26B has separate PPP links 35 and 37 each terminating on different home gateways 20 and 21, respectively. If the home gateways 20 and 21 and offload server 25 form a stack group, an SGBP bidding session is then used to establish one of the systems as master of the MLP bundle comprising of PPP links 35 and 37.

One PPP session 34 is forwarded from NAS 27B to home gateway 20. A second PPP session 34 is forwarded from remote client 26B to home gateway 21. The LCP sessions conducted at home gateway 20 and 21 specify MLP. A second L2F session 39 forwards the PPP link 35 and/or PPP link 37 over LAN 22 to the system that currently serves as master of the MLP bundle.

The MLP bundle master conducts a MLP session with the two links 35 and 37, even though each link may terminate on a different dial-in server. Multichassis MLP allows a system not acting as a direct termination point for any link to function as bundle master. For example, if offload server 25 gains mastership of the MLP bundle during the SGBP bidding session, the PPP links 35 and 37 are forwarded to the offload server 25. The offload server 25 then conducts MLP while the home gateways 20 and 21 serve essentially as switches.

The SGBP can also be used independently of MLP to forward one link to another system. Regardless of whether another link 37 exists, offload server 25 may be able to process link 35 faster than home gateway 20. The SGBP is used by home gateways 20 and 21 and offload server 25 to bid for link 35. If offload server 25 makes the highest bid, the link 35 is forwarded to offload server 25.

The remote client 26B usually keeps a password for each NAS that it may want to dial into. The identification of the NAS is passed to the remote client, so the remote client can select the appropriate password. The password is then sent to the home system for authentication as shown in FIG. 8. A stack group can comprise multiple systems each having a different name. Normally, the remote client would have to keep a separate password for each system that could be a member of the stack group. If a system is added to the stack group, each remote client would have to be reconfigured to add a password for the new stack group member.

To eliminate the remote client 26B from having to maintain separate passwords for each stack group member, the stack group is assigned a stack-group name. Remote client 26B negotiates MLP during an LCP session which forms links 35 and 37 into a bundle. The stack group name is used in place of the host name for home gateways 20 and 21 during CHAP authentication. Thus, systems can be added to LAN 22 and assigned to the stack group without having to reconfigure the remote client 26B.

Figure 17:
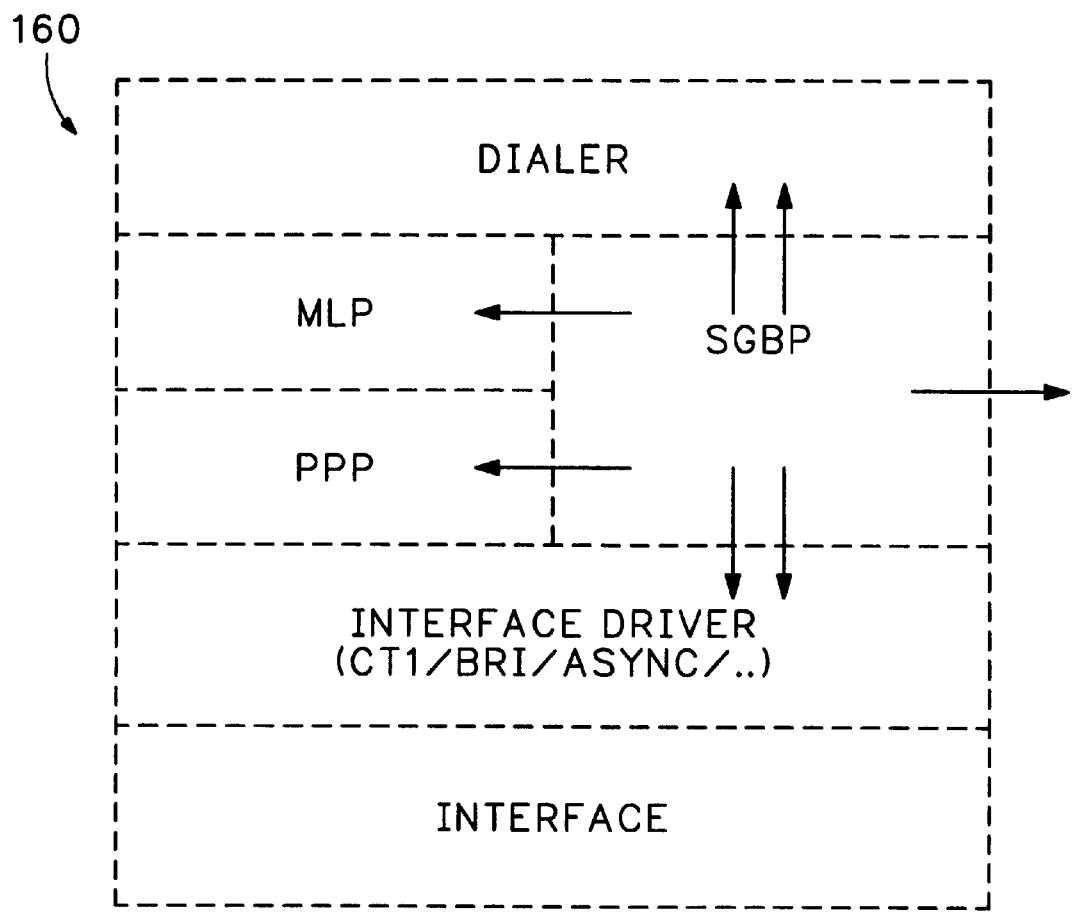
FIG. 17 is a communication layer diagram including the SGBP system.

FIG. 17 is the communication layer diagram for the SGBP. SGBP is conducted through the interface driver, PPP, MLP and dialer levels of a datagram. Typically, the functions of SGBP are conducted in software.

Thus, the SGBP provides quick resolution of bundle mastership. The bidding protocol also operates independently of the IP based medium of each stack group member. As long as the access server has an IP address and is able to perform multi-chassis MLP, the stack group members can be connected on different LANs and connected by different medium.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. A method for conducting a multilink session between multiple systems connected together on a network, comprising:

identifying establishment of a first communication link on a first one of the multiple systems;

identifying establishment of a second communication link on a second one of the multiple systems, the first and second communication link establishing a multilink bundle;

initiating a bidding session for obtaining bid values associated with each one of the multiple systems, the bid values each identifying a priority of the associated one of the multiple systems for being a bundle master that processes all links in the multilink bundle;

comparing the bid values associated with each one of the multiple systems;

establishing one of the multiple systems having a highest priority bid value as the bundle master; and initiating the first and second one of the multiple systems to forward to the assigned bundle master any of the first communication link and second communication link not terminating on the bundle master after the first communication link is terminated on the first one of the multiple systems and the second communication link is terminated on the second one of the multiple systems, the bundle master then conducting the multilink session by combining packets from the first communication link and with the second communication link.

2. A method according to claim 1 wherein the first communication link and the second communication link are each established using a multilink point-to-point protocol.

3. A method according to claim 1 wherein the step of establishing the bundle master includes the following steps:

establishing at least some of the multiple systems as stack group members;

identifying the first communication link and the second communication link as part of the multilink bundle;

determining whether the bundle master has been assigned to the multilink bundle;

sending out a bid request to each one of the identified stack group members when no bundle master is currently assigned to the multilink bundle;

receiving bids from the stack group members for mastership of the multilink bundle; and assigning bundle master of the multilink bundle to one of the stack group members providing a highest bid value.

4. A method according to claim 3 wherein establishing stack group members comprise the following steps:

sending a random number from the first one of the multiple systems to the second one of the multiple systems;

encrypting the random number with the second system according to a password;

forwarding the encrypted random number to the first system;

independently encrypting the random number with the first system;

establishing the first and second system as stack group members when the random numbers encrypted by the first and second system match; and establishing communication connections between the first and second system.

5. A method according to claim 3 including the following steps:

sending out the bid request from one of the stack group members first receiving a call;

receiving the bid values at the stack group member sending out the bid request;

comparing the bid values;

assigning bundle master according to the compared bid values; and forwarding all communication links for the call to the bundle master after the communication links are terminated on the stack group members.

6. A method according to claim 3 including forwarding additional communication links associated with the multilink bundle and established on one of the systems in the stack group to the bundle master.

7. A method according to claim 3 wherein the bidding session comprises the following steps:

bidding values according to a computational power of the individual stack group members and according to a number of multilink bundles currently being processed by the individual stack group members.

8. A method according to claim 3 including the following steps:

establishing separate tunnels between each one of the stack group members;

encapsulating a link level protocol for the communication link in a layer-two forwarding protocol; and forwarding the encapsulated link level protocol through the tunnels to the bundle master.

9. A method of bidding for communication link events with a system in a network, comprising:

identifying with the system other systems in the network that are members of a common stack group;

establishing separate connections between the system and each one of the other members in the common stack group;

receiving one of the events at the system, the received event terminated at the system and identified as associated with the common stack group;

generating a bid for processing all of the events associated with the common stack group, the bid compared with bids generated by the other members of the common stack group;

processing the received event with the system and receiving and processing any other events initially received and terminated on other members of the stack group when the generated bid is the highest bid for any of the members of the stack group; and forwarding the received event and any other events terminated at the system and associated with the stack group to another one of the members of the stack group when that other member of the stack group has the highest bid.

10. A method according to claim 9 including the following steps:

initiating a bid request from the system receiving the event to the other members of the stack group, the bid request causing the other members of the stack group to generate bids; and receiving the generated bids from the other members of the stack group, the bids having values that vary according to user selectable default values that are preassigned to individual members of the stack group, a calibrated value that represents a processing capacity for individual members of the stack group and a dynamic variable representing a number of bundles active on the individual members of the stack group at the time the bid request is initiated;

assigning one of the members of the stack group making a highest bid as a bundle master; and forwarding all events associated with the stack group to the assigned bundle master.

11. A method according to claim 10 wherein at least one of the events comprises establishment of a multilink point to point link.

12. A multichassis multiple point-to-point system, comprising:

multiple dial-in servers providing separate physical termination points for a bundle of communication links, the dial-in servers conducting a bidding session by initiating bid values associated with each one of the multiple dial-in servers, the bid values each identifying a priority of the associated one of the multiple dial-in servers for being a bundle master that processes all the communication links in the bundle, one of the dial-in servers comparing the bid values associated with each one of the multiple dial-in servers, establishing one of multiple dial-in servers having a highest priority bid value as the bundle master, and notifying the other dial-in servers of the bundle master;

the communication links in the bundle forwarded by the dial-in servers after terminating on the dial-in servers to the bundle master, the bundle master then conducting a multilink point to point session with the bundle of communication links.

13. A system according to claim 12 including a public switched telephone network coupling one or more remote clients to the multiple dial-in servers.

14. A system according to claim 12 wherein at least some of the dial-in servers are coupled together through a local network or through a wide area network.

15. A system according to claim 14 including an offload server coupled to the local network or wide area network, the offload server conducting the multilink point to point session solely with the communication links forwarded from the other dial-in servers.

16. A system, comprising;

a first interface for receiving one or more links from a remote client;

a second interface for coupling to a network; and a processor coupled to the first and second interface, the processor identifying links belonging to a multilink bundle and sending a bid in a bidding process that is compared with other bids for mastership of the multilink bundle, the processor forwarding the received one or more links terminated at the system and belonging to the multilink bundle to another system over the network when that other system wins mastership of the multilink bundle by generating a winning bid during the bidding process;

the processor processing the received one or more links along with processing any additional links belonging to the multilink bundle received and terminated on other systems when the processor wins mastership of the multilink bundle by generating the winning bid during the bidding process.

17. A system according to claim 16 including a memory for storing bid values that represent the system processing capacity, the bid values determining when the processor forwards links or receives links.

18. A method for conducting a multichassis multilink session, comprising:

establishing a stack group with multiple members of a dial-in pool;

establishing multiple communication links at the stack group members that operate together as a multilink bundle;

sending bid requests to the stack group members upon receiving the communication links;

initiating bids from the stack group members for mastership of the multilink bundle;

comparing the bids and assigning one of the stack group members making a highest bid as a bundle master;

forwarding the communication links in the bundle terminated at the stack group members to the bundle master; and conducting the multilink session with the bundle master.

19. A method according to claim 18 including sending bid values from the stack group members that vary according to a number of active bundles on the stack group members.

20. A method according to claim 18 including sending bid values from the stack group members that equal a default value+a calibrated value−a number of active bundles on the stack group member.

21. A method according to claim 18 including manually configuring the bid value for the stack group members.

22. A method according to claim 1 wherein each one of the multiple systems generates the bid values based on multiple dynamic bid weighting criteria.

23. A method according to claim 22 wherein one of the dynamic bid weighting criteria varies depending on whether the associated one of the multiple systems is currently controlling the first communication link or second communication link.

24. A method according to claim 22 wherein the dynamic bid weighting criteria varies according to a location of the associated one of the multiple systems in relation to the systems receiving the first communication link and the second communication link.

25. A method according to claim 22 wherein the dynamic bid weighting criteria varies according to a capacity of the associated one of the multiple systems for processing packets from the first communication link and the second communication link.

26. A method according to claim 9 including the following:

establishing point-to-point link events from a multilink bundle between a remote client and an internet service provider using a link level protocol; and conducting a layer 2 forwarding protocol between the internet service provider and the network that projects the point-to-point link events from the multilink bundle from the internet service provider to the network thereby creating a virtual direct dial-up session between the remote client and said local network.

27. A system according to claim 17 wherein the processor and the memory conduct a layer 2 forwarding protocol that projects the links through an internet infrastructure to the network independently of an internet protocol used in the internet infrastructure.

28. A method according to claim 1 wherein the first or second one of the multiple systems initiates the bidding session and compares the bid values.

29. A method according to claim 1 wherein a third one of the multiple systems that does not serve as a termination point for any communications link initiates the bidding session and compares the bid values.

30. A system according to claim 16 wherein the processor identifies other systems that are stack group members assigned to the multilink bundle, sends out bid requests to the identified stack group members, receives bids from the stack group members for mastership of the multilink bundle, and assigns bundle master of the multilink bundle to one of the stack group members providing a highest bid value.

31. A system according to claim 16 including a network processing node operating independently of the processor wherein the network processing node identifies other systems that are stack group members assigned to the multilink bundle, sends out bid requests to each one of the identified stack group members, receives bids from the stack group members for mastership of the multilink bundle, and assigns bundle master of the multilink bundle to one of the stack group members providing a highest bid value.

32. A system according to claim 16 wherein the processor establishes stack group members for the multilink bundle as follows:

sending a random number from the processor to at least one other system;

enabling the other system to encrypt the random number according to a password;

independently encrypting the random number with the processor;

establishing the other system as one of the stack group members when the random numbers encrypted by the processor and the other system match; and establishing communication connections between the processor and the other system.

33. A system according to claim 16 wherein the processor sends out bid requests to other systems, the processor then receiving the bid values from the other systems, comparing the bid values, and assigning mastership of the multilink bundle according to the compared bid values.

34. A system according to claim 16 wherein the processor sends the bid according to processor computational power or according to a number of links currently being processed by the processor.

35. A computer program for use in a network processing device, said computer program, comprising:

event occurrence detection for detecting communication links that are part of a multilink bundle;

bidding initiation for initiating a bidding session that generates a bid value for the network processing device and initiates generation of bid values from other network processing devices, the bid values identifying priorities of the network processing devices for being a bundle master that processes all the communication links in the multilink bundle;

bid comparison for comparing the bid values and identifying as the bundle master one of the network processing devices having a highest bid value;

bundle master notification for notifying the network processing devices of the bundle master;

link forwarding for forwarding any of the communication links to the bundle master when the network processing device is not the bundle master; and multilink processing for processing any communication links terminated on the network processing device and processing other communication links in the multilink bundle terminated and then forwarded from the other network processing devices when the network processing device is the bundle master.

36. A software program for operating in a network processing device, comprising:

program code for identifying other network processing devices that are members of a common stack group;

program code for establishing separate connections between each one of the other network processing devices identified as members of the common stack group;

program code for receiving one or more communications links identified as associated with the common stack group;

program code for initiating a bid for processing all communications links associated the common stack group, the bid compared with bids generated by the other members in the common stack group;

program code for processing all the communication links associated with the common stack group when the generated bid is the highest bid for any of the members in the common stack group; and program code for forwarding any terminated communication links associated with the common stack group when another member of the common stack group generates the highest bid.

* * * * *